(12) United States Patent
Baptist et al.

(10) Patent No.: US 10,387,247 B2
(45) Date of Patent: Aug. 20, 2019

(54) DISPERSED STORAGE NETWORK FILE SYSTEM DIRECTORY

(71) Applicant: CLEVERSAFE, INC., Chicago, IL (US)

(72) Inventors: Andrew Baptist, Mt. Pleasant, WI (US); Manish Motwani, Chicago, IL (US)

(73) Assignee: PURE STORAGE, INC., Mountain View, CA (US)

( * ) Notice: Subject to any disclaimer, the term of this patent is extended or adjusted under 35 U.S.C. 154(b) by 846 days.

(21) Appl. No.: 14/291,199

(22) Filed: May 30, 2014

(65) Prior Publication Data

US 2014/0281815 A1    Sep. 18, 2014

Related U.S. Application Data

(63) Continuation of application No. 12/779,640, filed on May 13, 2010, now Pat. No. 9,244,768.

(60) Provisional application No. 61/313,582, filed on Mar. 12, 2010.

(51) Int. Cl.
| | | |
|---|---|---|
| *G06F 3/06* | (2006.01) | |
| *G06F 16/17* | (2019.01) | |
| *G06F 11/10* | (2006.01) | |
| *G06F 12/06* | (2006.01) | |
| *G06F 16/11* | (2019.01) | |
| *G06F 16/16* | (2019.01) | |
| *H04L 29/08* | (2006.01) | |
| *G06F 11/20* | (2006.01) | |

(52) U.S. Cl.
CPC .......... *G06F 11/1076* (2013.01); *G06F 3/064* (2013.01); *G06F 3/067* (2013.01); *G06F 3/0629* (2013.01); *G06F 12/0646* (2013.01); *G06F 16/113* (2019.01); *G06F 16/122* (2019.01); *G06F 16/125* (2019.01); *G06F 16/162* (2019.01); *H04L 67/1097* (2013.01); *G06F 11/2094* (2013.01)

(58) Field of Classification Search
USPC ........................................................ 707/693
See application file for complete search history.

(56) References Cited

U.S. PATENT DOCUMENTS

| | | |
|---|---|---|
| 4,092,732 A | 5/1978 | Ouchi |
| 5,454,101 A | 9/1995 | Mackay et al. |
| 5,485,474 A | 1/1996 | Rabin |
| 5,774,643 A | 6/1998 | Lubbers et al. |

(Continued)

OTHER PUBLICATIONS

Shamir; How to Share a Secret; Communications of the ACM; vol. 22, No. 11; Nov. 1979; pp. 612-613.

(Continued)

*Primary Examiner* — Jeff A Burke
*Assistant Examiner* — Raheem Hoffler
(74) *Attorney, Agent, or Firm* — Garlick & Markison; Timothy W. Markison; Timothy D. Taylor

(57) ABSTRACT

A dispersed storage device manages a file system directory of a dispersed storage network by receiving a data object to be stored and a user file name of the data object, calculating a data compression function of the data object, creating a file identifier based on a result of the data compression function, creating a source name for the data object using the file identifier and linking the user file name to the source name in the file system directory.

20 Claims, 17 Drawing Sheets

(56) References Cited

U.S. PATENT DOCUMENTS

| | | | |
|---|---|---|---|
| 5,802,364 A | 9/1998 | Senator et al. | |
| 5,809,285 A | 9/1998 | Hilland | |
| 5,890,156 A | 3/1999 | Rekieta et al. | |
| 5,987,622 A | 11/1999 | Lo Verso et al. | |
| 5,991,414 A | 11/1999 | Garay et al. | |
| 6,012,159 A | 1/2000 | Fischer et al. | |
| 6,058,454 A | 5/2000 | Gerlach et al. | |
| 6,128,277 A | 10/2000 | Bruck et al. | |
| 6,175,571 B1 | 1/2001 | Haddock et al. | |
| 6,192,472 B1 | 2/2001 | Garay et al. | |
| 6,256,688 B1 | 7/2001 | Suetaka et al. | |
| 6,272,658 B1 | 8/2001 | Steele et al. | |
| 6,301,604 B1 | 10/2001 | Nojima | |
| 6,356,949 B1 | 3/2002 | Katsandres et al. | |
| 6,366,995 B1 | 4/2002 | Vilkov et al. | |
| 6,374,336 B1 | 4/2002 | Peters et al. | |
| 6,415,373 B1 | 7/2002 | Peters et al. | |
| 6,418,539 B1 | 7/2002 | Walker | |
| 6,449,688 B1 | 9/2002 | Peters et al. | |
| 6,567,948 B2 | 5/2003 | Steele et al. | |
| 6,571,282 B1 | 5/2003 | Bowman-Amuah | |
| 6,609,223 B1 | 8/2003 | Wolfgang | |
| 6,718,361 B1 | 4/2004 | Basani et al. | |
| 6,728,713 B1 * | 4/2004 | Beach | G06F 11/1417 |
| 6,760,808 B2 | 7/2004 | Peters et al. | |
| 6,785,768 B2 | 8/2004 | Peters et al. | |
| 6,785,783 B2 | 8/2004 | Buckland | |
| 6,826,711 B2 | 11/2004 | Moulton et al. | |
| 6,879,596 B1 | 4/2005 | Dooply | |
| 7,003,688 B1 | 2/2006 | Pittelkow et al. | |
| 7,024,451 B2 | 4/2006 | Jorgenson | |
| 7,024,609 B2 | 4/2006 | Wolfgang et al. | |
| 7,080,101 B1 | 7/2006 | Watson et al. | |
| 7,103,824 B2 | 9/2006 | Halford | |
| 7,103,915 B2 | 9/2006 | Redlich et al. | |
| 7,111,115 B2 | 9/2006 | Peters et al. | |
| 7,140,044 B2 | 11/2006 | Redlich et al. | |
| 7,146,644 B2 | 12/2006 | Redlich et al. | |
| 7,171,493 B2 | 1/2007 | Shu et al. | |
| 7,222,133 B1 | 5/2007 | Raipurkar et al. | |
| 7,240,236 B2 | 7/2007 | Cutts et al. | |
| 7,272,613 B2 | 9/2007 | Sim et al. | |
| 7,636,724 B2 | 12/2009 | de la Torre et al. | |
| 8,386,540 B1 * | 2/2013 | McAlister | G06F 17/30566 707/771 |
| 2002/0062422 A1 | 5/2002 | Butterworth et al. | |
| 2002/0166079 A1 | 11/2002 | Ulrich et al. | |
| 2003/0018927 A1 | 1/2003 | Gadir et al. | |
| 2003/0037261 A1 | 2/2003 | Meffert et al. | |
| 2003/0065617 A1 | 4/2003 | Watkins et al. | |
| 2003/0084020 A1 | 5/2003 | Shu | |
| 2004/0024963 A1 | 2/2004 | Talagala et al. | |
| 2004/0122917 A1 | 6/2004 | Menon et al. | |
| 2004/0215998 A1 | 10/2004 | Buxton et al. | |
| 2004/0228493 A1 | 11/2004 | Ma et al. | |
| 2005/0100022 A1 | 5/2005 | Ramprashad | |
| 2005/0114594 A1 | 5/2005 | Corbett et al. | |
| 2005/0125593 A1 | 6/2005 | Karpoff et al. | |
| 2005/0131993 A1 | 6/2005 | Fatula, Jr. | |
| 2005/0132070 A1 | 6/2005 | Redlich et al. | |
| 2005/0144382 A1 | 6/2005 | Schmisseur | |
| 2005/0229069 A1 | 10/2005 | Hassner | |
| 2006/0047907 A1 | 3/2006 | Shiga et al. | |
| 2006/0136448 A1 | 6/2006 | Cialini et al. | |
| 2006/0156059 A1 | 7/2006 | Kitamura | |
| 2006/0224603 A1 | 10/2006 | Correll, Jr. | |
| 2007/0079081 A1 | 4/2007 | Gladwin et al. | |
| 2007/0079082 A1 | 4/2007 | Gladwin et al. | |
| 2007/0079083 A1 | 4/2007 | Gladwin et al. | |
| 2007/0088970 A1 | 4/2007 | Buxton et al. | |
| 2007/0174192 A1 | 7/2007 | Gladwin et al. | |
| 2007/0214285 A1 | 9/2007 | Au et al. | |
| 2007/0234110 A1 | 10/2007 | Soran et al. | |
| 2007/0283167 A1 | 12/2007 | Venters, III et al. | |
| 2008/0140937 A1 * | 6/2008 | Nalawade | G06F 12/0871 711/119 |
| 2009/0094251 A1 | 4/2009 | Gladwin et al. | |
| 2009/0094318 A1 | 4/2009 | Gladwin et al. | |
| 2009/0172666 A1 * | 7/2009 | Yahalom | G06F 3/0605 718/1 |
| 2010/0023524 A1 | 1/2010 | Gladwin et al. | |

OTHER PUBLICATIONS

Rabin; Efficient Dispersal of Information for Security, Load Balancing, and Fault Tolerance; Journal of the Association for Computer Machinery; vol. 36, No. 2; Apr. 1989; pp. 335-348.

Chung; An Automatic Data Segmentation Method for 3D Measured Data Points; National Taiwan University; pp. 1-8; 1998.

Plank, T1: Erasure Codes for Storage Applications; FAST2005, 4th Usenix Conference on File Storage Technologies; Dec. 13-16, 2005; pp. 1-74.

Wildi; Java iSCSi Initiator; Master Thesis; Department of Computer and Information Science, University of Konstanz; Feb. 2007; 60 pgs.

Legg; Lightweight Directory Access Protocol (LDAP): Syntaxes and Matching Rules; IETF Network Working Group; RFC 4517; Jun. 2006; pp. 1-50.

Zeilenga; Lightweight Directory Access Protocol (LDAP): Internationalized String Preparation; IETF Network Working Group; RFC 4518; Jun. 2006; pp. 1-14.

Smith; Lightweight Directory Access Protocol (LDAP): Uniform Resource Locator; IETF Network Working Group; RFC 4516; Jun. 2006; pp. 1-15.

Smith; Lightweight Directory Access Protocol (LDAP): String Representation of Search Filters; IETF Network Working Group; RFC 4515; Jun. 2006; pp. 1-12.

Zeilenga; Lightweight Directory Access Protocol (LDAP): Directory Information Models; IETF Network Working Group; RFC 4512; Jun. 2006; pp. 1-49.

Sciberras; Lightweight Directory Access Protocol (LDAP): Schema for User Applications; IETF Network Working Group; RFC 4519; Jun. 2006; pp. 1-33.

Harrison; Lightweight Directory Access Protocol (LDAP): Authentication Methods and Security Mechanisms; IETF Network Working Group; RFC 4513; Jun. 2006; pp. 1-32.

Zeilenga; Lightweight Directory Access Protocol (LDAP): Technical Specification Road Map; IETF Network Working Group; RFC 4510; Jun. 2006; pp. 1-8.

Zeilenga; Lightweight Directory Access Protocol (LDAP): String Representation of Distinguished Names; IETF Network Working Group; RFC 4514; Jun. 2006; pp. 1-15.

Sermersheim; Lightweight Directory Access Protocol (LDAP): The Protocol; IETF Network Working Group; RFC 4511; Jun. 2006; pp. 1-68.

Satran, et al.; Internet Small Computer Systems Interface (iSCSI); IETF Network Working Group; RFC 3720; Apr. 2004; pp. 1-257.

Xin, et al.; Evaluation of Distributed Recovery in Large-Scale Storage Systems; 13th IEEE International Symposium on High Performance Distributed Computing; Jun. 2004; pp. 172-181.

Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.

* cited by examiner computing system 10

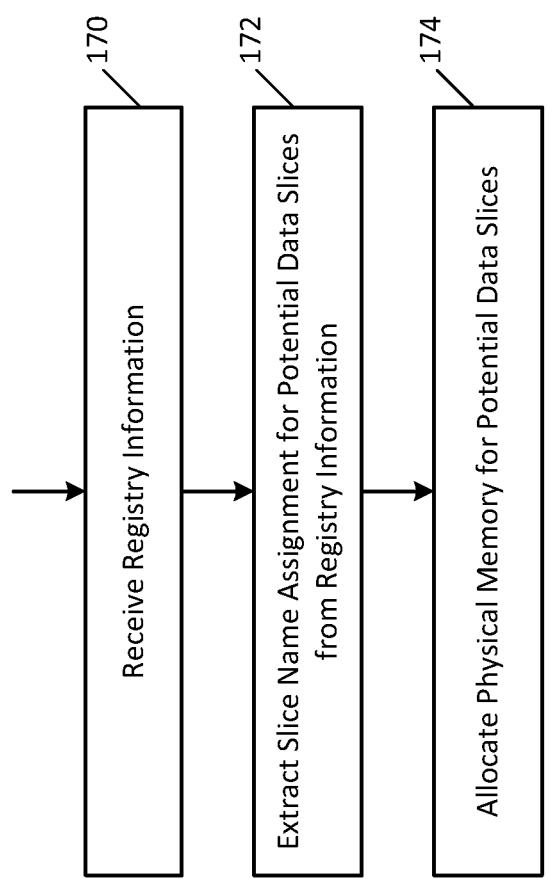

DISPERSED STORAGE NETWORK FILE SYSTEM DIRECTORY

CROSS REFERENCE TO RELATED PATENTS/PATENT APPLICATIONS

The present U.S. Utility Patent Application claims priority pursuant to 35 U.S.C. § 120 as a continuation of U.S. Utility application Ser. No. 12/779,640, entitled "Dispersed storage network file system directory," filed May 13, 2010, which claims priority pursuant to 35 U.S.C. § 119(e) to U.S. Provisional Application No. 61/313,582, entitled "Distributed storage network resource allocation," filed Mar. 12, 2010, both of which are hereby incorporated herein by reference in their entirety and made part of the present U.S. Utility Patent Application for all purposes.

BACKGROUND OF THE INVENTION

Technical Field of the Invention

This invention relates generally to computing systems and more particularly to data storage solutions within such computing systems.

Description of Related Art

Computing systems are known to communicate, process, and store data. Such computing systems range from wireless smart phones to data centers that support millions of web searches, stock trades, or on-line purchases every day. Each type of computing system is constructed, and hence operates, in accordance with one or more communication, processing, and storage standards. With such standards, and with advances in technology, more and more of the global information content is being converted into electronic formats. Electronic content pervasiveness is producing increasing demands on the storage function of computing systems.

A typical computer storage system includes one or more memory devices aligned with the needs of the various operational aspects of the computer's processing and communication functions. Generally, the immediacy of access dictates what type of memory device is used. For example, random access memory (RAM) can be accessed in any random order with a constant response time, thus it is typically used for cache memory and main memory. By contrast, memory device technologies that require physical movement such as magnetic disks, tapes, and optical discs, have a variable response time as the physical movement can take longer than the data transfer, thus they are typically used for secondary memory (e.g., hard drive, backup memory, etc.).

A computer's storage system will be compliant with one or more computer storage standards that include, but are not limited to, network file system (NFS), flash file system (FFS), disk file system (DFS), small computer system interface (SCSI), internet small computer system interface (iSCSI), file transfer protocol (FTP), and web-based distributed authoring and versioning (WebDAV). These standards specify the data storage format (e.g., files, data objects, data blocks, directories, etc.) and interfacing between the computer's processing function and its storage system, which is a primary function of the computer's memory controller.

Despite the standardization of the computer and its storage system, memory devices fail; especially commercial grade memory devices that utilize technologies incorporating physical movement (e.g., a disc drive). For example, it is fairly common for a disc drive to routinely suffer from bit level corruption and to completely fail after three years or more of use. One solution is to use a higher-grade disc drive, which adds significant cost to a computer.

Another solution is to utilize multiple levels of redundant disc drives to replicate the data into two or more copies. One such redundant drive approach is called redundant array of independent discs (RAID). In a RAID device, a RAID controller adds parity data to the original data before storing it across the array. The parity data is calculated from the original data such that the failure of a disc will not result in the loss of the original data. For example, RAID 5 uses three discs to protect data from the failure of a single disc. The parity data, and associated redundancy overhead data, reduces the storage capacity of three independent discs by one third (e.g., n−1=capacity). RAID 6 can recover from a loss of two discs and requires a minimum of four discs with a storage capacity of n−2.

While RAID addresses the memory device failure issue, it is not without its own failure issues that affect its effectiveness, efficiency and security. For instance, as more discs are added to the array, the probability of a disc failure increases, which increases the demand for maintenance. For example, when a disc fails, it needs to be manually replaced before another disc fails and the data stored in the RAID device is lost. To reduce the risk of data loss, data on a RAID device is typically copied on to one or more other RAID devices. While this addresses the loss of data issue, it raises a security issue since multiple copies of data are available, which increases the chances of unauthorized access. Further, as the amount of data being stored grows, the overhead of RAID devices becomes a non-trivial efficiency issue.

BRIEF DESCRIPTION OF THE SEVERAL VIEWS OF THE DRAWINGS

FIGS. 6A and 6B are logic diagrams of exemplary methods for configuration of a system resource;

DETAILED DESCRIPTION OF THE INVENTION

Figure 1:
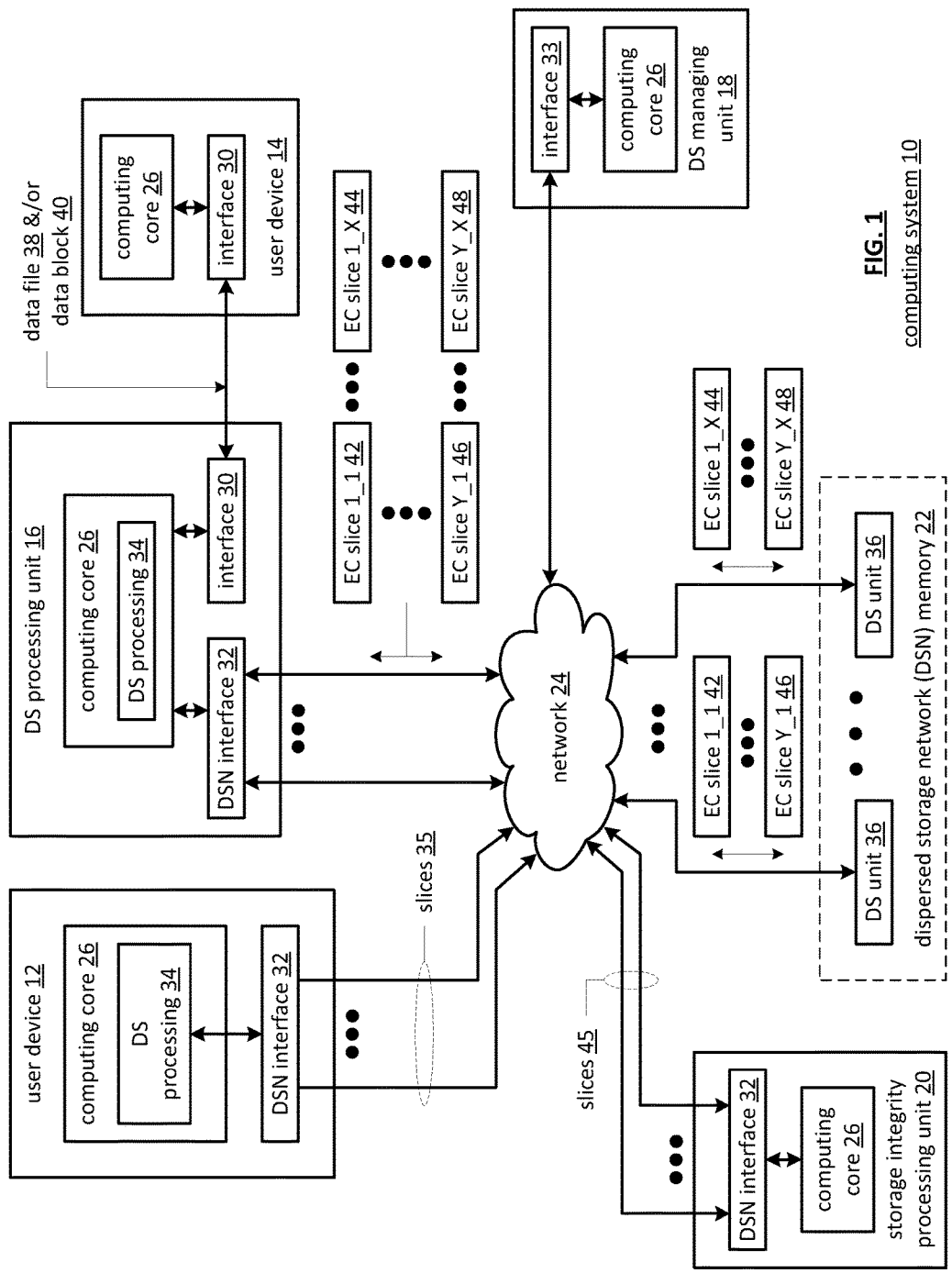
FIG. 1 is a schematic block diagram of an embodiment of a computing system in accordance with the invention.

FIG. 1 is a schematic block diagram of a computing system 10 that provides dispersed storage of data. The computing system 10 includes one or more of a first type of user devices 12, one or more of a second type of user devices 14, at least one dispersed storage (DS) processing unit 16, at least one DS managing unit 18, at least one storage integrity processing unit 20, and a dispersed storage network (DSN) memory 22 coupled via a network 24.

The network 24 may include one or more wireless and/or wire lined communication systems; one or more private intranet systems and/or public internet systems; and/or one or more local area networks (LAN) and/or wide area networks (WAN). The DSN memory 22 includes a plurality of dispersed storage (DS) units 36 for storing data of the system. Each of the DS units 36 may be located at a geographically different site than the other DS units (e.g., one in Chicago, one in Milwaukee, etc.).

Each of the user devices 12-14, the DS processing unit 16, the DS managing unit 18, and the storage integrity processing unit 20 may be a portable computing device (e.g., a social networking device, a gaming device, a cell phone, a smart phone, a personal digital assistant, a digital music player, a digital video player, a laptop computer, a handheld computer, a video game controller, and/or any other portable device that includes a computing core) and/or a fixed computing device (e.g., a personal computer, a computer server, a cable set-top box, a satellite receiver, a television set, a printer, a fax machine, home entertainment equipment, a video game console, and/or any type of home or office computing equipment). Such a portable or fixed computing device includes a computing core 26 and one or more interfaces 30, 32, and/or 33. An embodiment of the computing core 26 will be described with reference to FIG. 2.

With respect to the interfaces, each of the interfaces 30, 32, and 33 includes software and/or hardware to support one or more communication links via the network 24 and/or directly. For example, interface 30 supports a communication link (wired, wireless, direct, via a LAN, via the network 24, etc.) between the first type of user device 14 and the DS processing unit 16. As another example, DSN interface 32 supports a plurality of communication links via the network 24 between the DSN memory 22 and the DS processing unit 16, the first type of user device 12, and/or the storage integrity processing unit 20. As yet another example, interface 33 supports a communication link between the DS managing unit 18 and any one of the other devices and/or units 12, 14, 16, 20, and/or 22 via the network 24.

In general and with respect to data storage, the system 10 supports three primary functions: dispersed network data storage management, dispersed data storage and retrieval, and data storage integrity verification. In accordance with these three primary functions, data can be distributedly stored in a plurality of physically different locations and subsequently retrieved in a reliable and secure manner regardless of failures of individual storage devices, failures of network equipment, the duration of storage, the amount of data being stored, attempts at hacking the data, etc.

The DS managing unit 18 performs dispersed network data storage management functions, which include establishing dispersed data storage parameters, performing network operations, performing network administration, and/or performing network maintenance. The DS managing unit 18 establishes the dispersed data storage parameters (e.g., allocation of virtual DSN memory space, dispersed storage parameters, security parameters, billing information, user profile information, etc.) for one or more of the user devices 12-14 (e.g., established for individual devices, established for a user group of devices, established for public access by the user devices, etc.). For example, the DS managing unit 18 coordinates the creation of a vault (e.g., a virtual memory block) within the DSN memory 22 for a user or a group of users (for private and/or public access). As used herein, the term "user" refers to a human being or a machine (e.g., computing device). The DS managing unit 18 also determines the dispersed data storage parameters for the vault. In particular, the DS managing unit 18 determines a number of slices (e.g., the number that a data segment of a data file and/or data block is partitioned into for dispersed storage) and a read threshold value (e.g., the minimum number of slices required to reconstruct the data segment).

As another example, the DS managing unit 18 creates and stores, locally or within the DSN memory 22, user profile information for the vault. The user profile information includes one or more of authentication information, permissions, and/or the security parameters. The security parameters may include one or more of encryption/decryption scheme, one or more encryption keys, key generation scheme, and data encoding/decoding scheme.

As yet another example, the DS managing unit 18 manages billing information for a particular user, user group, vault access, public vault access, etc. For instance, the DS managing unit 18 may track the number of times a user accesses a private vault and/or public vaults, which can be used to generate a per-access bill. In another instance, the DS managing unit 18 tracks the amount of data stored and/or retrieved by a user device and/or a user group, which can be used to generate a per-data-amount bill.

The DS managing unit 18 also performs network operations, network administration, and/or network maintenance. For example, the DS managing unit 18 can monitor performance of the devices and/or units of the system 10 for potential failures, determine the devices and/or unit's activation status, determine the devices' and/or units' loading, and any other system level operation that affects the performance level of the system 10. For example, the DS managing unit 18 may receive and aggregate network management alarms, alerts, errors, status information, performance information, and messages from the devices 12-14 and/or the units 16, 20, 22. For example, the DS managing unit 18 can receive a simple network management protocol (SNMP) message regarding the status of the DS processing unit 16.

The DS managing unit 18 also performs network maintenance by identifying equipment within the system 10 that needs replacing, upgrading, repairing, and/or expanding. For example, the DS managing unit 18 may determine that the DSN memory 22 needs more DS units 36 or that one or more of the DS units 36 needs updating.

The second primary function (i.e., dispersed data storage and retrieval) begins and ends with a user device 12-14. For instance, if user device 14 has a data file 38 and/or data block 40 to store in the DSN memory 22, it sends the data file 38 and/or data block 40 to the DS processing unit 16 via its interface 30. As will be described in greater detail with reference to FIG. 2, the interface 30 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). In addition, the interface 30 may attach a user identification code (ID) to the data file 38 and/or data block 40.

The DS processing unit 16 receives the data file 38 and/or data block 40 via its interface 30 and performs dispersed storage (DS) processing 34 thereon (e.g., an error coding dispersal storage function). The DS processing (error coding dispersal storage function) 34 begins by partitioning the data file 38 and/or data block 40 into one or more data segments, represented as Y data segments. For example, the DS processing 34 may partition the data file 38 and/or data block 40 into a fixed byte size segment (e.g., $2^1$ to $2^n$ bytes, where n=>2) or a variable byte size (e.g., change byte size from segment to segment, or from groups of segments to groups of segments, etc.).

For each of the Y data segments, the DS processing 34 error encodes (e.g., forward error correction (FEC), information dispersal algorithm, or error correction coding) and slices (or slices then error encodes) the data segment into a plurality of error coded (EC) data slices 42-48, represented as X slices per data segment. The number of slices (X) per segment, which corresponds to a number of pillars n, is set in accordance with the dispersed data storage parameters and the error coding scheme. For example, if a Reed-Solomon (or other FEC scheme) is used in an n/k system, then a data segment is divided into n slices, where k number of slices are needed to reconstruct the original data (i.e., k is the threshold). As a few specific examples, the n/k factor may be 5/3; 6/4; 8/6; 8/5; 16/10.

For each EC slice 42-48, the DS processing unit 16 creates a unique slice name and appends it to the corresponding EC slice 42-48. The slice name includes universal DSN memory addressing routing information (e.g., virtual memory addresses in the DSN memory 22) and user-specific information (e.g., user ID, file name, data block identifier, etc.).

The DS processing unit 16 transmits the plurality of EC slices 42-48 to a plurality of DS units 36 of the DSN memory 22 via the DSN interface 32 and the network 24. The DSN interface 32 formats each of the slices for transmission via the network 24. For example, the DSN interface 32 may utilize an internet protocol (e.g., TCP/IP, etc.) to packetize the EC slices 42-48 for transmission via the network 24.

The number of DS units 36 receiving the EC slices 42-48 is dependent on the dispersed data storage parameters established by the DS managing unit 18. For example, the DS managing unit 18 may indicate that each slice is to be stored in a different DS unit 36. As another example, the DS managing unit 18 may indicate that like slice numbers of different data segments are to be stored in the same DS unit 36. For example, the first slice of each of the data segments is to be stored in a first DS unit 36, the second slice of each of the data segments is to be stored in a second DS unit 36, etc. In this manner, the data is encoded and distributedly stored at physically diverse locations to improve data storage integrity and security. Further examples of encoding the data segments will be provided with reference to one or more of FIGS. 2-13.

Each DS unit 36 that receives an EC slice 42-48 for storage translates the virtual DSN memory address of the slice into a local physical address for storage. Accordingly, each DS unit 36 maintains a virtual to physical memory mapping to assist in the storage and retrieval of data.

User device 12 performs a similar function as user device 14 to store data in the DSN memory 22 with the exception that user device 12 includes the DS processing 34 (error coding dispersal storage function). As such, the device 12 encodes and slices the data file and/or data block it has to store. The device 12 then transmits the slices 35 to the DSN memory via its DSN interface 32 and the network 24.

For user device 14 to retrieve a data file or data block from memory, it issues a read command via its interface 30 to the DS processing unit 16. The DS processing unit 16 performs the DS processing 34 to identify the DS units 36 storing the slices of the data file and/or data block based on the read command. The DS processing unit 16 may also communicate with the DS managing unit 18 to verify that the user device 14 is authorized to access the requested data.

Assuming that the user device 14 is authorized to access the requested data, the DS processing unit 16 issues slice read commands to at least a threshold number of the DS units 36 storing the requested data (e.g., to at least 10 DS units for a 16/10 error coding scheme). Each of the DS units 36 receiving the slice read command, verifies the command, accesses its virtual to physical memory mapping, retrieves the requested slice, or slices, and transmits it to the DS processing unit 16.

Once the DS processing unit 16 has received a read threshold number of slices for a data segment, it performs an error decoding function and de-slicing to reconstruct the data segment. When Y number of data segments have been reconstructed, the DS processing unit 16 provides the data file 38 and/or data block 40 to the user device 14. Note that user device 12 performs a similar process to retrieve a data file and/or data block.

The storage integrity processing unit 20 performs the third primary function of data storage integrity verification. In general, the storage integrity processing unit 20 periodically retrieves slices 45, and/or slice names, of a data file or data block of a user device to verify that one or more slices have not been corrupted or lost (e.g., the DS unit failed). The retrieval process mimics the read process previously described.

If the storage integrity processing unit 20 determines that one or more slices is corrupted or lost, it rebuilds the corrupted or lost slice(s) in accordance with the error coding scheme. The storage integrity processing unit 20 stores the rebuild slice, or slices, in the appropriate DS unit(s) 36 in a manner that mimics the write process previously described.

Figure 2:
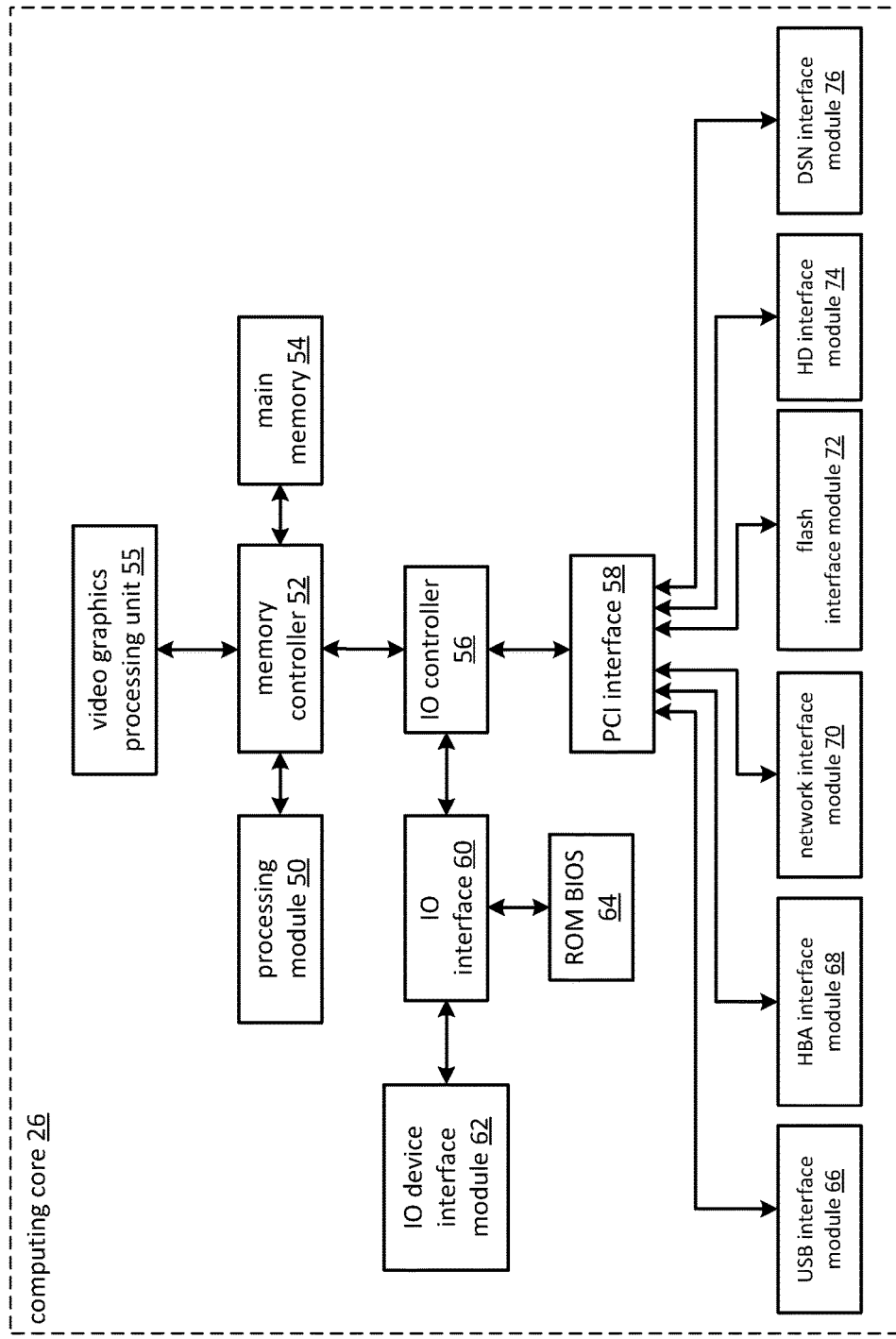
FIG. 2 is a schematic block diagram of an embodiment of a computing core in accordance with the invention.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, an IO interface 60, at least one IO device interface module 62, a read only memory (ROM) basic input output system (BIOS) 64, and one or more memory interface modules. The memory interface module(s) includes one or more of a universal serial bus (USB) interface module 66, a host bus adapter (HBA) interface module 68, a network interface module 70, a flash interface module 72, a hard drive interface module 74, and a DSN interface module 76. It should be noted that the DSN interface module 76 and/or the network interface module 70 may function as the interface 30 of the user device 14 of FIG. 1. It should further be noted that the IO device interface module 62 and/or the memory interface modules may be collectively or individually referred to as IO ports.

The processing module 50 may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module 50 may have an associated memory and/or memory element, which may be a single memory device, a plurality of memory devices, and/or embedded circuitry of the processing module 50. Such a memory device may be a read-only memory, random access memory, volatile memory, non-volatile memory, static memory, dynamic memory, flash memory, cache memory, and/or any device that stores digital information. Note that if the processing module 50 includes more than one processing device, the processing devices may be centrally located (e.g., directly coupled together via a wired and/or wireless bus structure) or may be distributedly located (e.g., cloud computing via indirect coupling via a local area network and/or a wide area network). Further note that when the processing module 50 implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element stores, and the processing module 50 executes, hard coded and/or operational instructions corresponding to at least some of the steps and/or functions illustrated in FIGS. 1-13.

Figure 3:
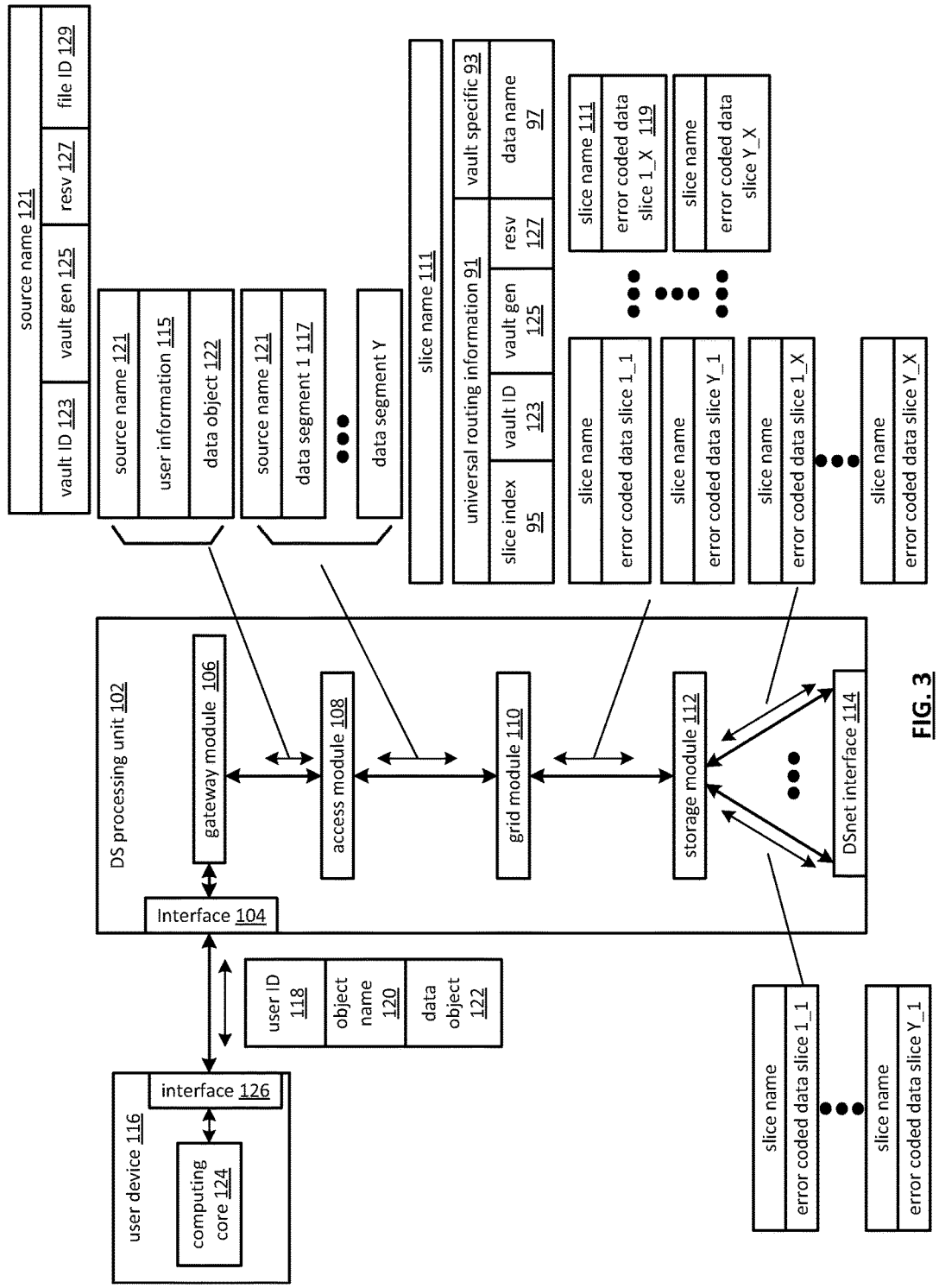
FIG. 3 is a schematic block diagram of an embodiment of a dispersed storage processing unit in accordance with the invention.

FIG. 3 is a schematic block diagram of an embodiment of a dispersed storage (DS) processing unit 102 that corresponds to the DS processing unit 16 and/or DS processing 34/user device 12 shown in FIG. 1. The DS processing unit 102 includes an interface 104, a gateway module 106, an access module 108, a grid module 110, a storage module 112, and the dispersed storage network (DSnet) interface 114. In another embodiment, one or more of the gateway module 106, the access module 108, the grid module 110, and the storage module 112 may be implemented outside of the DS processing unit 102.

The DS processing unit 102 functions include the transformation of incoming data objects 122 (e.g., files, blocks, streams) from a user device 116 via the interface 104 into error coded (EC) data slices, with attached slice names, which the DS processing unit 102 stores in the DSN memory via the DSnet interface 114. The DS processing unit 102 functions further include retrieving EC data slices, with attached slice names, from the DSN memory and transforming the EC data slices into data objects, which the DS processing unit 102 communicates to the user device 116 via the interface 104. The user device 116 corresponds to one of user devices 12 or 14 shown in FIG. 1.

The interface 104 of the DS processing unit 102 is coupled to the interface 126 of the user device 116. The interfaces 104, 126 may be logical if the DS processing unit 102 is part of the user device 116. The interfaces 104, 126 collectively form a DSN memory interface to accommodate the OS file system of the user device such that, from the perspective of the user device 116, data objects 122 may be stored to and retrieved from the DS processing unit 102 as if the DS processing unit 102 were any other compatible storage system. For example, the interface 104 may receive the data object 122, a user identifier 118 of the user requesting storage of the data object 122 and an object name 120 (file name of the data object in the OS of the user) from interface 126 for storage of the data object 122.

The gateway module 106 couples the interface 104 to the access module 108 and may include functions to act as a portal between the user device 116 and the DS processing unit 102 allowing them to communicate between protocols providing computing system interoperability. The gateway module 106 converts protocols and messages as a function of the user device 116 OS file system. For example, the gateway module 106 converts a retrieve-file message in the NFS protocol format from the first user device 116 to a dispersed storage network message in the dispersed storage network protocol to trigger the DS processing unit 102 to retrieve the data and return it to the first user device 116. The gateway module 106 may include other functions including access control to prevent unauthorized use, user identification, user information retrieval, traffic monitoring, statistics generation, DS processing unit configuration, and DS processing unit management. For example, the gateway module 106 may provide user access authentication to verify a user has permissions to perform one or more DSN memory access functions including write, read, delete, list, status, configure, and/or other functions that access the DSN memory.

Thus, the gateway module 106 may access user information 115 based on the user identification 118. In an exemplary embodiment, the gateway module 106 receives the user identifier 118 and looks up a vault identifier (ID) based on the user identifier 118. As mentioned above, each vault is associated with at least one user. Therefore, each vault may contain user information 115, such as user attributes (e.g., who the user(s) are, billing data, etc.) and operational parameters. Examples of operational parameters may include one or more of the error coding algorithm, the width X (number of pillars or slices per segment for this vault), the encryption algorithm, a slicing parameter, a compression algorithm, an integrity check method, caching settings, parallelism settings, and/or other parameters that may be used to access the DSN memory. The gateway module 106 may access the user information 115 internally or by retrieving the user information 115 from another source, such as the DS managing unit, the user device 116, the DSN memory, and/or a source external to the computing system.

The gateway module 106 may also create a source name 121 to associate with the data object 122. The source name 121 contains a file identifier (ID) 129 that is associated with the data object 122, as described in more detail below in connection with FIGS. 11A and 11B, the vault generation number 125, the reserved field 127, and the vault ID 123. The gateway module 106 may pass the user information 115, source name 121, and data object 122 to other elements of the DS processing unit 102 to assist in the operation thereof.

In an embodiment, the access module 108 communicates data objects 122, user information 115, and the source name 121 with the gateway module 106, and data segments 117, user information 115, and the source name 121 with the grid module 110. Thus, the access module 108 creates a series of data segments 1 through Y from the data object 122 to be stored. In one embodiment, the number of segments Y is chosen (e.g., part of the user information) to be a fixed number for a given user vault, but the size of the segments varies as a function of the size of the data object 122. For instance, if the data object 122 is an image file of 4,194,304 eight bit bytes (e.g., 33,554,432 bits) and the number of segments Y=131,072, then each segment is 256 bits or 32 bytes. In another embodiment, the number of segments Y is a variable number based on the size of each data file with the objective to have a constant size of the data segments (e.g., data segment size is specified in the user information). For instance, if the data object 122 is an image file of 4,194,304 bytes and the fixed size of each segment is 4,096 bytes, the then number of segments Y=1,024.

The access module 108 includes the source name 121 in each data segment 117 before passing the data segment 117 to the grid module 110. The grid module 110 may pre-manipulate (e.g., compression, encryption, cyclic redundancy check (CRC), etc.) the data segment 117 before creating X error coded data slices 119 for each data segment 117. The grid module 110 creates XY error coded data slices 119 for the Y data segments of the data object 122. The grid module 110 adds forward error correction bits to the data segment bits in accordance with an error coding algorithm (e.g., Reed-Solomon, Convolution encoding, Trellis encoding, etc.) to produce an encoded data segment. The grid module 110 determines the slice name 111 and attaches the unique slice name 111 to each EC data slice 119.

The slice name 111 includes a universal routing information field 91 and a vault specific field 93. In an embodiment, the universal routing information field is 24 bytes and the vault specific field is 24 bytes. The universal routing information field 91 contains a slice index 95, the vault ID 123, the vault generation 125, and the reserved field 127. The slice index 95 is based on the pillar number and the vault ID such that it is unique for each pillar (e.g., slices of the same pillar for the same vault for any segment will share the same slice index). The vault specific field 93 contains a data name 97 that includes the file ID 129 and a segment number (e.g., a sequential numbering of the data segments of a simple data object or a data block number).

The data name 97 may be the same for slice names of slices for the same data segment and may vary for slice names of different data segments. The file ID 129 portion of the data name 97 does not vary for any slice name of the same data object. It should be noted that the DS processing unit 102 may modify the data name 97 such that the file ID 129 is not transparent (e.g., produce a data name from a hash of the source name to disguise the file ID).

The number of pillars, or slices X per data segment (e.g., X=16) is chosen as a function of the error coding objectives. A read threshold T (e.g., T=10) of the error coding algorithm is the minimum number of error-free error coded data slices required to be able to reconstruct a data segment. The DS processing unit 102 can compensate for X−T (e.g., 16−10=6) missing error coded data slices per data segment.

The grid module 110 slices the encoded data segment 117 to produce the error coded data slices 119. The slicing complements the error coding algorithm and accommodates the nature of dispersing error coded data slices to different DS storage units of the DSN memory. The grid module 110 may use interleaving to slice the encoded data segment such that if an entire error coded slice is lost it will not destroy a large contiguous portion of the data segment preventing reconstruction.

The size of each error coded data slice is a function of the size of the data segment and the error coding algorithm. In an embodiment, the size of each error coded data slice is the size of the data segment divided by a size threshold. For example, if the data segment is 32 bytes and the size threshold is 10, then each error coded slice (without any addressing) is about 4 bytes.

The grid module 110 may also perform post-data manipulation on the error coded data slices. For example, such post-data manipulation may include one or more of slice level compression, encryption, CRC, addressing, tagging, and/or other manipulation to improve the effectiveness of the computing system.

The grid module 110 and/or storage module 112 may determine which DS units to store each error coded data slice based in part on a dispersed storage memory mapping associated with the user's vault. The location determination may also be based in part on DS unit attributes including one or more of availability, self-selection, performance history, link speed, link latency, ownership, available memory, domain, cost, and more generally on one or more of a prioritization scheme, a centralized selection message from another source, a lookup table, who owns the data, and/or any other factor to optimize the operation of the computing system.

In an embodiment, the number of DS units is equal to or greater than the number of pillars (slices X per segment) so that no more than one error coded data slice of the same data segment is stored on the same DS unit. Error coded data slices of the same slice number but of different segments (e.g., EC data slice 1 of data segment 1 and EC data slice 1 of data segment 2) may be stored on the same or different DS units.

The grid module 110 will pass the EC coded data slices 119 (including the slice names 111) with DS unit determinations (e.g., the DS storage unit numbers), when the grid module 110 makes the DS unit determinations, to the storage module 112. The storage module 112 may perform integrity checks on the EC data slices and then transmit the EC data slices 1 through X of each segment 1 through Y to the DS units according to the previous location determination via the DSnet interface 114. The DS units will store the EC data slices and locally keep a table to convert virtual DSN addresses into physical storage addresses.

In an example of a data object retrieval operation, user device 116 sends a data file retrieval message to the gateway module 106 of the DS processing unit 102. The gateway module 106 translates the data file retrieval from the conventional file system interface into a retrieval message of a DSN memory interface convention. The grid module 110 and/or storage module 112 receives the retrieval message and determines where (e.g., which DS units) the EC data slices for each segment of the data file should be. The storage module 112 retrieves the EC data slices from each of the determined DS units and passes the retrieved EC data slices to the grid module 110. The storage module may only retrieve the threshold T number of EC data slices if they are known to be intact (e.g., no CRC errors etc. as indicated by the DS unit and/or by the grid module 110). The grid module 110 de-slices the EC data slices and decodes the de-sliced data in accordance with the error coding algorithm to produce the data segments. The grid module 110 passes the data segments to the access module 108, which re-assembles the data file by aggregating the data segments in order. The access module 108 passes the data file to the gateway module 106, which converts the format to the file system protocol of the first user device 116.

Figure 4:
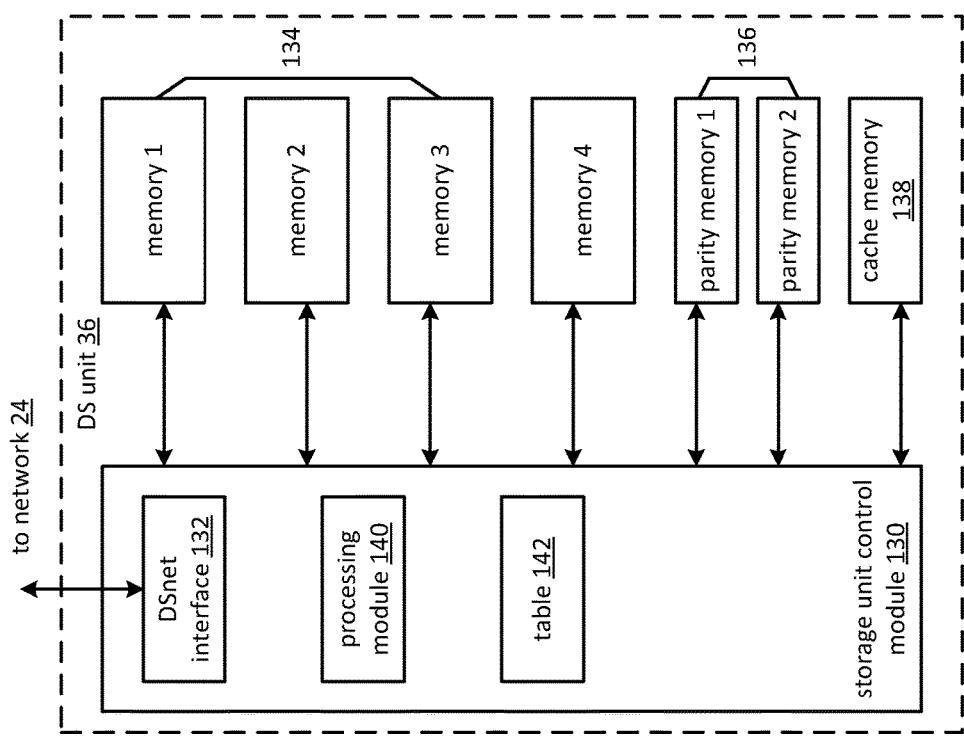
FIG. 4 is a schematic block diagram of an embodiment of a dispersed storage unit in accordance with the invention.

FIG. 4 is a schematic block diagram of an embodiment of a dispersed storage unit 36 that includes a storage unit control module 130, a plurality of memories 134, a plurality of parity memories 136, and a cache memory 138. In FIG. 4, there are four memories 134, labeled memory 1-memory 4 and two parity memories 136, labeled parity memory 1-parity memory 2. In another embodiment, there may be 8, 16, or more memories and parity memories.

The storage unit control module 130 may be implemented, for example, with the computing core of FIG. 2. The memories 134, parity memories 136 and cache memory 138 may be one or more of a magnetic hard disk, NAND flash, read only memory, optical disk, and/or any other type of read-only, or read/write memory. The memories 134 may be implemented as part of or outside of the DS storage unit 36. For example, memory 1 may be implemented in the DS unit and memory 4 may be implemented in a remote server (e.g., a different DS unit coupled to the DS unit via the network). In an example, memories 1-4 and parity memories 1-2 are implemented with magnetic hard disk technology and the cache memory is implemented with NAND flash technology.

The storage unit control module 130 includes a DSnet interface 132 and a processing module 140. The storage unit control module 130 is coupled to the computing system 10 of FIG. 1 via the DSnet interface 132 and network 24. The storage unit control module 130 may communicate provisioning, configuration, allocation, and management information via the network 24 with the DS managing unit 18, shown in FIG. 1. For example, the storage unit control module 130 allocates portions of memories 1-4 to vaults and/or users and downloads required software based on the communication with the DS managing unit 18. The method of allocation and configuration will be discussed in greater detail with reference to FIGS. 5-13.

The storage unit control module 130 may receive EC data slices to store via the DSnet interface 132. In an embodiment, the storage unit control module 130 determines where (e.g., which address on which of the memories 134) to store the received EC data slice. The determination may be based on one or more of data slice metadata, a command (e.g., from the DS processing unit indicating which memory type to use), a type of data indicator, a priority indicator, a memory state indicator, available memory, memory fullness (e.g., overall and/or for a storage set across pillars), a vault memory use indicator (e.g., how much memory a given user is using), memory performance data, memory cost data, memory characteristics, and/or any other parameter to facilitate desired levels of efficiency and performance. The memory state may indicate whether the memory is in a write only state, a read only state, a write with read priority state, or some other state to indicate the availability. The method of memory utilization will be discussed in greater detail with reference to FIGS. 5-13.

The storage unit control module 130 creates and maintains a local virtual DSN address to physical memory table 142. The storage unit control module 130 determines where previously stored EC data slices are located based on the local virtual DSN address to physical memory table 142 upon receiving a retrieve command via the network 24. The table 142 may be stored within the internal memory on the storage unit control module 130 (as shown) or within any of the memories 134. The storage unit control module 130 may save activity records (e.g., memory utilization, errors, stores, retrievals, etc.) as logs in any of the memories 134.

The storage unit control module 130 may utilize the parity memories 136 to store and retrieve parity across the data stored in memories 1-4. The storage unit control module 130 may immediately recreate a slice that is stored in a memory 134 in the write only state based on reading the other memories 134 in the read only state, reading the parity memories 1 and or 2, and calculating the desired slice. The storage unit control module 130 may temporarily pair a write only state memory 1-4 with a write only state parity memory 1-2 to enable rapid writes of new slices (e.g., write a slice to memory 1 and write the parity to parity memory 1), while another parity memory in the read only state may be available to provide the needed parity to reconstruct slices that are stored on the write only state memory.

In an example, the storage unit control module 130 may choose memory 1 (e.g., a magnetic hard disk drive) to store the received EC data slice since memory 1 is in a write only state (e.g., available immediately), the memories 2-4 are in the read only state, parity memory 1 is paired with memory 1 in the write only state, parity memory 2 is in the ready only state, and the memory 1 memory characteristics favorably matches the EC data slice metadata including performance, efficiency, cost, and response time. The storage unit control module 130 queues a read request in the cache memory 138 when the requested slice is in the memory 1 (but in the write state). The storage unit control module 130 may process the queued read request for memory 1 by retrieving the request from the cache memory 138, reading the memories 2-4 (e.g., the same memory stripe or common address range across each), reading the parity memory 2, and calculating the desired slice.

Note that the storage unit control module 130 may queue write requests and slices when the desired memory 2-4 is in the read only state. The storage unit control module 130 may subsequently change the state of memory 1 from write only to the read only state, or the write with read priority state to enable processing of the queued read request. Note that the DS unit 36 can immediately retrieve slices where the slices are stored in memories 134 in the read only state, or in the write with read priority state (e.g., memories 2-4). Further note that the DS unit 36 may rotate the write only state amongst the memories 1-4 and the parity memories 1-2 from time to time to even out the cumulative storage and optimize performance. The method to choose the memories and change the memory state will be discussed in greater detail with reference to FIGS. 8, 9, 12, and 13.

Figure 5:
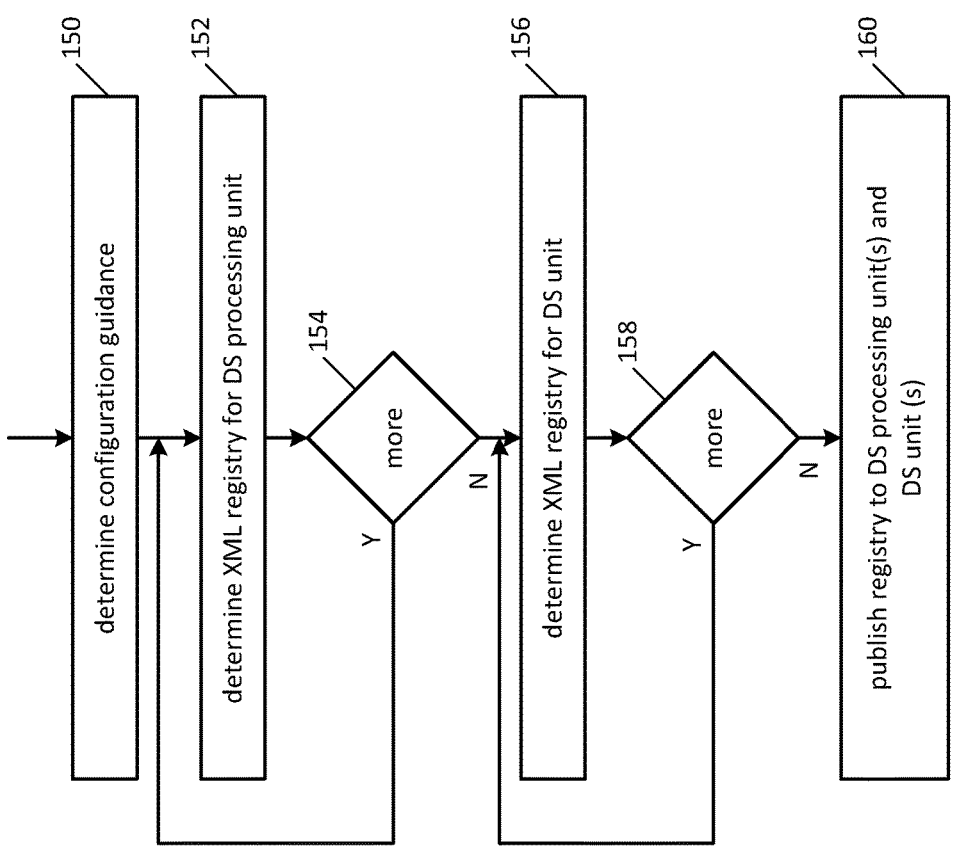
FIG. 5 is a logic diagram of an exemplary method for allocation of system resources.

FIG. 5 is a logic diagram of a method for allocating system resources, where the DS managing unit generates and publishes system resource allocation registry information to resources of the computing system to facilitate system resource initialization. It should be noted that the DS managing unit, DS processing unit, DS unit, storage integrity processing unit, and/or user device may generate and publish system resource allocation registry information.

The method begins with the DS managing unit determining configuration guidance for one or more system resources 150. The determination may be based, for example, on one or more of a user input, a pre-configuration file, a command, user registration information, user subscription information, and/or a request message from a new system resource. The configuration guidance may include, for example, the number of DS units, DS unit location (e.g., site number, geo-coordinates, address, . . . ), DS unit memory capacity, the number of DS processing units, DS processing unit location, DS processing unit capabilities, user profile information, operational parameters, DS unit storage set clusters (e.g., sets of DS units that support the pillars of a vault), vault ID, vault generations, vault type, and vault size.

The DS managing unit then determines the extensible markup language (XML) registry information for the DS processing unit based on the configuration guidance 152. The XML registry information may include vault ID, share names (e.g., "my_vault_1"), user names, rebuild assignments by slice name, FTP or WebDAV per vault, software module identifiers (ID) (e.g., iSCI block device, WebDAV simple data object support, platform, rebuilder, etc.), and any other parameters to facilitate the subsequent operation of the DS processing unit.

The DS managing unit next determines if there is at least one more DS processing unit 154. If there is at least one more DS processing unit, the method branches back to the step of the DS managing unit determining the XML registry information for the DS processing unit when there is at least one more DS processing unit 152.

When there are no more DS processing units, the DS managing unit determines the XML registry information for the DS unit based on the configuration guidance 156. The XML registry information may include slice name assignments, rebuild assignments by slice name, software module identifiers (ID) (e.g., vault loader, storage, platform, rebuilder, etc.), and any other parameters to facilitate the subsequent operation of the DS processing module.

The DS managing unit then determines if there is at least one more DS unit 158. If so, the method branches back to the step of the DS managing unit determining the XML registry information for the DS unit when there is at least one more DS unit 156.

When there are no more DS units, the DS managing unit publishes the XML registry information for the DS processing unit (s) and the DS units by sending the XML registry information to the DS processing unit (s) and the DS units and/or by sending a uniform resource identifier (URI) link such that the DS processing unit (s) and/or DS units can subsequently access the XML registry information 160. The DS processing unit (s) and/or DS units may self-configure based on the XML registry information. The configuration method will be discussed in greater detail with reference to FIGS. 6-7.

FIG. 6A is logic diagram of an exemplary method for configuration of a system resource, such as a DS unit. The method begins with the processing module of the DS unit receiving, via the DSnet interface, registry information from the network 170. The registry information can be sent directly to the DS unit from the DS managing unit or by accessing a link containing the registry information provided by the DS managing unit, as described above. In an example, the DS unit receives the registry information in response to sending a registry information request to the DS managing unit. In another example, the DS unit receives the registry information in an unsolicited method from time to time from the DS managing unit. The DS unit may store the registry information in the cache memory 138.

The DS unit then extracts from the registry information a slice name assignment for the DS unit 172. The slice name assignment indicates a range of slice names assigned to a vault and corresponding to a plurality of potential data slices that may be produced in the future. For example, each potential slice name within the range of slice names includes common slice identifiers consistent with a particular pillar of a vault. Examples of common slice identifiers include the slice index (which is based on the vault ID and pillar ID), the vault ID and the vault generation of the vault. Other elements of the slice name that do not indicate a particular pillar, but rather a particular data slice, include the file ID and the data segment number. Since the file ID is directly dependent upon the data object, as described in more detail below in connection with FIG. 11, the file ID varies over the range of slice names assigned to the DS unit. Therefore, within a slice name range assigned to the DS unit, the most significant bits of the DSN addresses are held constant, including the slice index, the vault identifier, and the vault generation, whereas the least significant bits of the DSN addresses sequence through the addresses to specify data slice information, including the file identifier or block identifier of potential future data slices.

Once the DS unit extracts the slice name assignment from the registry information, the processing module of the DS unit can allocate a portion of the physical memory of the DS unit to store the potential data slices for the vault 174. For example, if the range of slice names assigned to the DS unit requires one terabyte of memory to store all of the potential data slices associated with the range of slice names, the DS unit can allocate one terabyte of memory to the slice name range of the vault. However, the DS unit does not perform a mapping of data slices to physical memory addresses until the DS unit actually receives the data slices (i.e., a data object has been created and a user is requesting the data object to be stored).

Figure 6B:
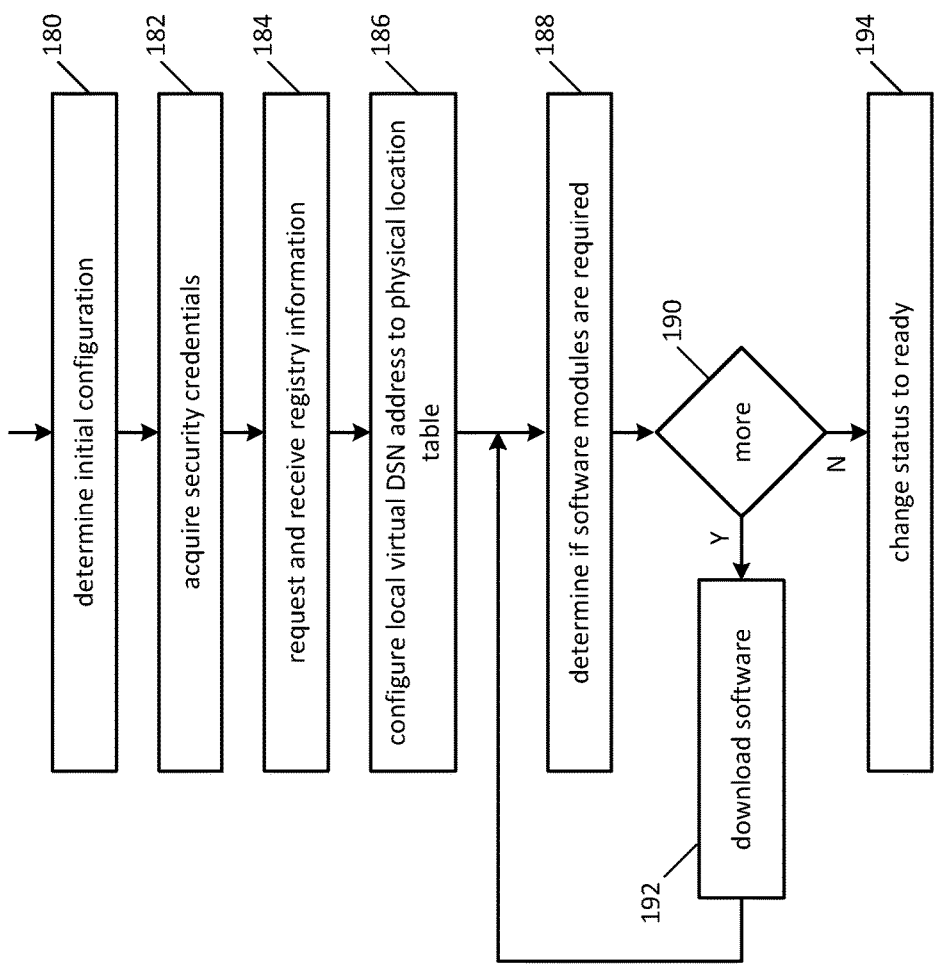

FIG. 6B is a logic diagram of a more detailed exemplary method for the initial configuration of a system resource where the DS unit (or any other system resource) obtains configuration and/or registry information to self-configure upon initialization.

The method begins with the DS unit determining the initial configuration based on one or more of a pre-programmed boot list, a command, and/or a received message 180. The initial configuration may include the DS unit name, the DS managing unit URI, memory configuration (e.g., number of memories, type of memory, memory characteristics, etc.), a log in ID, a private key, and/or a public key.

The DS unit then acquires security credentials by obtaining a signed certificate from a certificate authority (e.g., a function of the DS managing unit) in accordance with a security procedure standard such as one of the public key infrastructure (PKI) 182. The DS unit may utilize the signed certificate when subsequently communicating with other computing system resources (e.g., the DS managing unit) to authenticate itself.

Thereafter, the DS unit requests and receives registry information from the DS managing unit by either sending a request message or by accessing the registry information via the registry URI 184. The DS unit registry information may include one or more of slice name assignments (e.g., discrete slice names and/or slice name ranges), as described above in connection with FIG. 6A, rebuild assignments (e.g., pillars of vaults, local DS unit(s)), and required software module identifiers. For example, a rebuild assignment may indicate a lost or corrupt data slice of an actual data object to be rebuilt from one or more related data slices stored in other DS units.

The DS unit then configures a local virtual DSN address to physical location table based in part on the registry information 186. For example, the DS unit may allocate one terabyte of vault memory to vault 457 across slice name range 0000 to FFFF to physical memory device 2. However, the table will not be updated with the actual mapping of virtual addresses to physical addresses until data slices with slice names in the assigned slice name range are actually received.

The DS unit next determines if software modules are required based on the registry information (e.g., software module ID portion) and what software modules exist in the DS unit so far 188. If additional software modules are required 190, the DS unit downloads software by requesting it from the DS managing unit when the existing software modules do not include all of the software modules identified in the registry information 192. It should be noted that the registry software module ID may include one or more of a software program ID, a version ID, and/or software program configuration information. It should further be noted that the DS unit may download a different software version in accordance with the registry information.

The method concludes with the DS unit changing the DS unit status to ready when the DS unit determines that no more software modules are required 194. For example, the DS unit may send a status ready message to the DS managing unit, DS processing unit, and other system resources.

Figure 7:
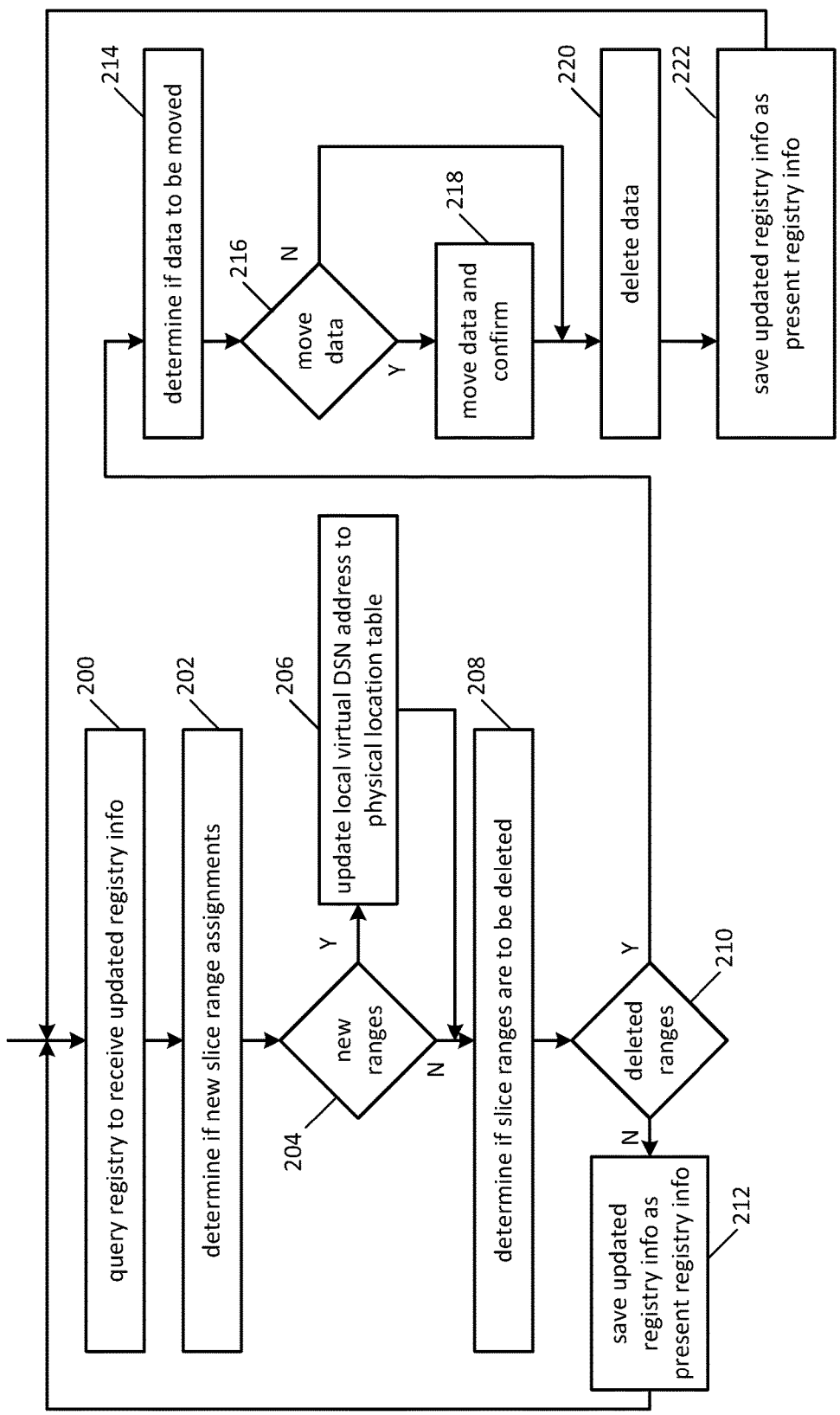
FIG. 7 is a logic diagram of an exemplary method for the re-configuration of a system resource.

FIG. 7 is a logic diagram of an exemplary method for the re-configuration of a system resource, where the DS unit may re-configure from time to time.

The method begins with the DS unit querying the registry to receive updated registry information 200. The DS unit may initiate the query from time to time, based on a command, or in response to detecting a system change. Note that the DS unit may utilize the registry information contained in the cache memory based on a previous update of the registry information. The DS unit may determine to update the registry information stored in the cache memory when the registry information is required for operation of the DS unit. The DS unit may continue to utilize the registry information stored in the cache memory when the DS unit does not receive updated registry information in response to a registry information update request message. The DS unit may determine if new slice range assignments are present in the updated registry information by comparing the updated registry information to the registry information previously stored at the DS unit 202. It should be noted that the new slice range assignment may result from a new vault being added, or from a present vault being expanded or contracted. If new slice range assignments are present 204, the DS unit allocates memory and updates the local virtual DSN address to physical location table based on the new slice name range assignments 206.

In the next step, the DS unit determines if slice ranges are to be deleted based on the updated registry information 208. The determination may be based on a delete command, or omission of slice ranges in the updated registry information when compared to the present registry information. When the DS unit determines that slice ranges are not to be deleted 210, the DS unit saves the updated registry information as the present registry information 212 and the method branches back to step 200, where the DS unit queries the registry.

However, it the DS unit determines that slice ranges are to be deleted, the DS unit determines if data (e.g., EC data slices corresponding to the slice ranges for deletion) is to be moved prior to deletion 214. The determination may be based on a move & delete command, or by a request from another system resource to send the affected data slices. If the DS unit determines that data is to be moved prior to deletion 216, the DS unit determines where to send the affected data slices, sends the slices, and may confirm that they were received 218. However, if the DS unit determines that the data is not to be moved prior to deletion 216, the method branches to step 220, where the data slices are deleted by the DS unit. Once the DS unit deletes the data slices from the memory, the DS unit saves the updated registry information as the present registry information 222 and the method branches back to step 200, where the DS unit queries the registry.

Figure 8:
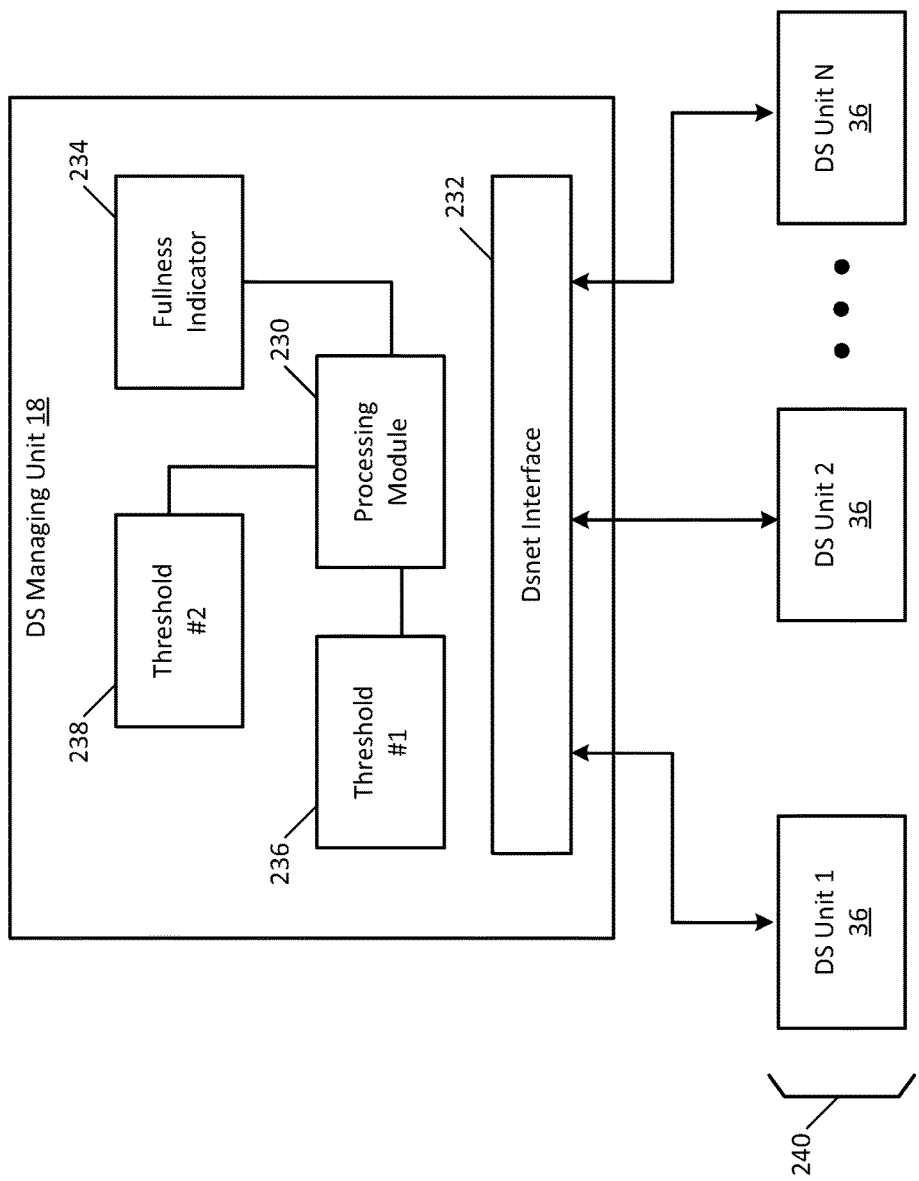
FIG. 8 is a schematic block diagram of an embodiment of a dispersed storage managing unit in accordance with the invention.

FIG. 8 is a schematic block diagram illustrating an embodiment of the DS managing unit 18. The DS managing unit 18 includes a processing module 230 and a DSnet interface 232. The DS managing unit 18 is further coupled to a storage set 240 via the DSnet interface 232. The storage set 240 may include, for example, one or more DS units 36 that together support each pillar of a DSN vault. Each DS unit within the storage set may be located at the same geographical location, or may be distributed among several geographical locations. However, in other embodiments, the storage set 240 may include only a single DS unit 36.

The processing module 230 determines a state of the storage set 240 based on of how full the total memory is within the storage set 240, and the processing module 230 controls access to the memory based on the state (e.g., slow or stop writes). The DS managing unit may take action (e.g., deleting data) to enable a state transition to a more desired state as will be discussed below in connection with FIGS. 9A and 9B.

Generally, the processing module 230 determines the state of the storage set 240 based on a storage set fullness indicator 234 and at least two thresholds of comparison 236 and 238. The storage set fullness indicator 234 indicates how full the DS unit storage set memory is with stored data (e.g., data slices). The processing module 230 determines the storage set fullness indicator 234 by, for example, an absolute measure (e.g., 2.5 terabytes for the vault) or as a percentage of a memory allocation for the vault (e.g., 60% of the allocated memory amount is utilized). For example, the processing module 230 may determine the memory allocation for the vault based on one or more of operational parameters of the vault, the user profile, a default allocation, a list, a command, a request, a user input, another DS managing unit, and/or a dynamic parameter. In addition, the processing module 230 may determine the absolute measure or percentage of allocation based on one or more of a lookup in the user vault (e.g., the processing module 230 may increment a memory utilization counter in the user vault upon new stores) and/or a query response to the storage set 240.

In an embodiment, the two thresholds 236 and 238 include a warning threshold and a high threshold, where the high threshold is higher than the warning threshold. For example, the warning threshold may indicate 75% utilization and the high threshold may indicate 95% utilization. The processing module 230 may determine the thresholds 236 and 238 based on, for example, one or more of operational parameters of the vault, the user profile, a default, a list, a command, a request, a user input, another DS managing unit, a rate of memory use indicator, and/or a dynamic parameter.

In an exemplary operation, when the processing module 230 detects that the storage set fullness indicator 234 is greater than (or compares unfavorably to) the warning threshold 236, the processing module may generate and send an alert message via DSnet interface 232 that includes the vault ID, a DS unit memory storage set ID, and a warning indicator (e.g., to invoke another process and/or to alert a system administrator). In addition, the processing module 230 may perform one or more mitigation functions to reduce the amount of memory used by the storage set 240. For example, the mitigation function may include one or more of determining if replacement memory (e.g., replacement physical memory devices within storage units or replacement storage units) has been added for the vault such that data may be moved to the replacement memory, determining if more storage units have been added to the storage set 240 such that new data may be written to the new storage units (instead of the current, already full storage units) or data may be rebalanced between the current storage set memory and the additional memory, and/or determining if a message has been received to temporarily utilize another memory for storage for this storage set (e.g., outside of the storage set including a different DS unit, a different DSN memory, or outside of the computing system).

Furthermore, when the processing module 230 detects that the storage set fullness indicator 234 is greater than (or compares unfavorably to) the high threshold 238, the processing module 230 may generate and send a high alert message via DSnet interface 232 that includes the vault ID, a DS unit memory storage set ID and a high indicator (e.g., to invoke another process and/or to alert a system administrator). The processing module 230 may also enact various mitigation functions, as described above, and/or change the mode of the storage set 240 from the write mode to the read only mode based on a command, a vault parameter, memory availability, a dynamic parameter (e.g., rate of memory use), and/or estimated time to mitigation complete. In an example, the processing module 230 may determine to leave the write mode active based on the rate of adding data to the storage set (e.g., the rate of adding data may be slow as compared to others or a benchmark). In another example, the processing module 230 may determine to change the mode to read only based on a relatively high rate of adding data and/or the relatively high level of memory utilization.

The processing module 230 may also activate a delete data mode to delete redundant and/or expired data and free up memory when the state is the high state for the storage set 240. The determination to activate the delete data mode may be based on one or more of a command, a vault parameter, memory availability, a dynamic parameter (e.g., rate of memory use), and/or estimated time to mitigation complete. For example, the processing module 230 may activate the delete data mode when the memory utilization is relatively high and the warning state mitigation has not substantially lowered the memory utilization.

In the delete data mode, the processing module 230 may determine redundant data based on retrieving data objects from the storage set 240 and comparing the data objects to each other, or by retrieving data object checksums from the storage set 240 and comparing the data object checksums to each other. The processing module 230 may determine expired data based on retrieving data object version numbers from the storage set 240 and comparing the data object version numbers to each other to identify the most current and the older versions. The processing module 230 can delete a redundant or older version of the data object and point all directory filenames for the data object to the single most current copy in the storage set 240. Methods to delete data and to prevent duplication of data will be discussed in greater detail with reference to FIGS. 10-11.

In another embodiment, instead of utilizing thresholds 236 and 238, the processing module 230 can compare the fullness indicator 234 of the storage set 240 to the fullness of one or more other storage sets (not shown) for the vault. Based on the fullness comparison between the different storage sets, the processing module 230 can determine where to store new data. For example, the processing module 230 can fill the least utilized storage sets first, eventually equalizing utilization across the system.

Figure 9A:
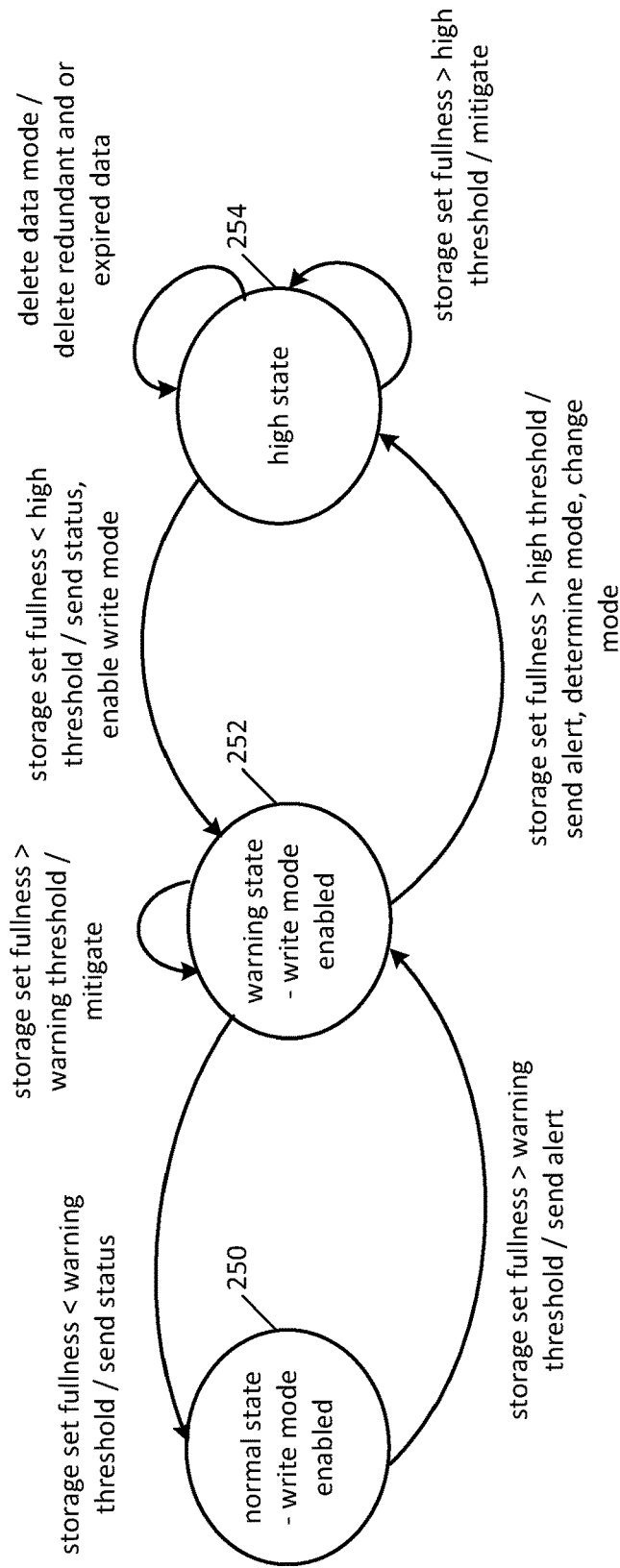
FIG. 9A is a state transition diagram illustrating the allocation of memory.

FIG. 9A is a state transition diagram illustrating the allocation of memory where the DS managing unit controls a DS unit storage set to determine the memory state of the storage set and provision storage within the storage set based on the memory state.

The DS unit storage set memory state may be in one of at least three states. The three states include a normal state 250, a warning state 252, and a high state 254. The DS managing unit allows writes to the DS unit storage set when the state is the normal state 250 or the warning state 252. The DS managing unit may not allow writes to the DS unit storage set when the state is the high state 254.

As described above, the DS managing unit determines the state based on a storage set fullness indicator and at least two thresholds of comparison. In an embodiment, the two thresholds of comparison include a warning threshold and a high threshold, where the high threshold is higher than the warning threshold. For example, the warning threshold may indicate 75% utilization and the high threshold may indicate 95% utilization.

The DS unit storage set memory state begins in the normal state 250, where the DS managing unit allows storing more data slices to the storage set by setting a mode of the storage set to a write mode. The DS managing unit may save the mode in the user vault, so that the DS processing unit may subsequently retrieve the mode from the user vault to readily determine the mode prior to storing new data to the storage set. For example, the DS processing unit can send new EC data slices to the DS unit memory storage set when the DS processing unit determines the mode is the write mode. In another example, the DS processing unit may not send new EC data slices to the DS unit memory storage set when the DS processing unit determines the mode is a read only mode (e.g., when in the high state).

The DS managing unit transitions the state of the storage set from the normal state 250 to the warning state 252 when the DS managing unit detects that the storage set fullness is greater than (or compares unfavorably to) the warning threshold. As mentioned above, the DS managing unit may send an alert message that includes a warning indicator to invoke another process and/or to alert a system administrator. In addition, when the DS managing unit determines that the storage set fullness is still greater than the warning threshold while in the warning state, the DS managing unit can perform one or more mitigation functions. The mitigation may include one or more of determining if replacement memory has been added for the vault such that data may be moved to the replacement memory, determining if more memory has been added to the storage set such that data may be rebalanced between the current storage set memory and the additional memory, and/or determining if a message has been received to temporarily utilize another memory for storage for this storage set (e.g., outside of the storage set including a different DS unit, a different DSN memory, or outside of the computing system).

The DS managing unit transitions the state of the storage set from the warning state 252 to the normal state 250 when the DS managing unit detects that the storage set fullness falls below (or compares favorably to) the warning threshold. It should be noted that this may be a result of one or more of the DS managing unit performing the mitigation function, a process has deleted data, thus freeing up memory, and/or the user has deleted a portion of the data in response to the alert message. The DS managing unit may send a status message that includes the storage set is in a normal state at this time.

The DS managing unit transitions the state of the storage set from the warning state 252 to the high state 254 when the DS managing unit detects that the storage set fullness is greater than (or compares unfavorably to) the high threshold. As mentioned above, the DS managing unit may send an alert message that includes a high indicator to invoke another process and/or to alert a system administrator. The DS managing unit may also change the storage set mode from the write mode to a read only mode based on a command, a vault parameter, memory availability, a dynamic parameter (e.g., rate of memory use), and/or estimated time to mitigation complete. In an example, the DS managing unit determines to leave the write mode active based on the rate of adding data to the storage set is slow as compared to others or a benchmark. In another example, the DS managing unit determines to change the mode to read only based on relatively high rate of adding data and/or the relatively high level of memory utilization.

The DS managing unit may also activate a delete data mode when the state is the high state 254 for the storage set, as also described above. For example, the DS managing unit may activate the delete data mode when the memory utilization is relatively high and the warning state mitigation has not substantially lowered the memory utilization. While in the delete data mode, the DS managing unit may delete redundant and/or expired data to free up memory to reduce the storage set fullness. For example, the DS managing unit may delete a redundant or older version of the data object and point all directory filenames for the data object to the single most current copy in the storage set. In addition, while the storage set state is still the high state 254, the DS managing unit may also perform the mitigation function. The mitigation function is intended to reduce the amount of memory used, as was previously discussed.

The DS managing unit transitions the state of the storage set from the high state 254 to the warning state 252 when the DS managing unit detects that the storage set fullness falls below (or compares favorably to) the high threshold. It should be noted that this may be a result of one or more of the DS managing unit performing the mitigation function, a process has deleted data freeing up memory, and/or the user has deleted a portion of the data in response to the alert message. The DS managing unit may send a status message that includes the warning state indicator and may enable the writing to the storage set by activating the write mode. The activities in the warning state may also continue, as discussed earlier.

Figure 9B:
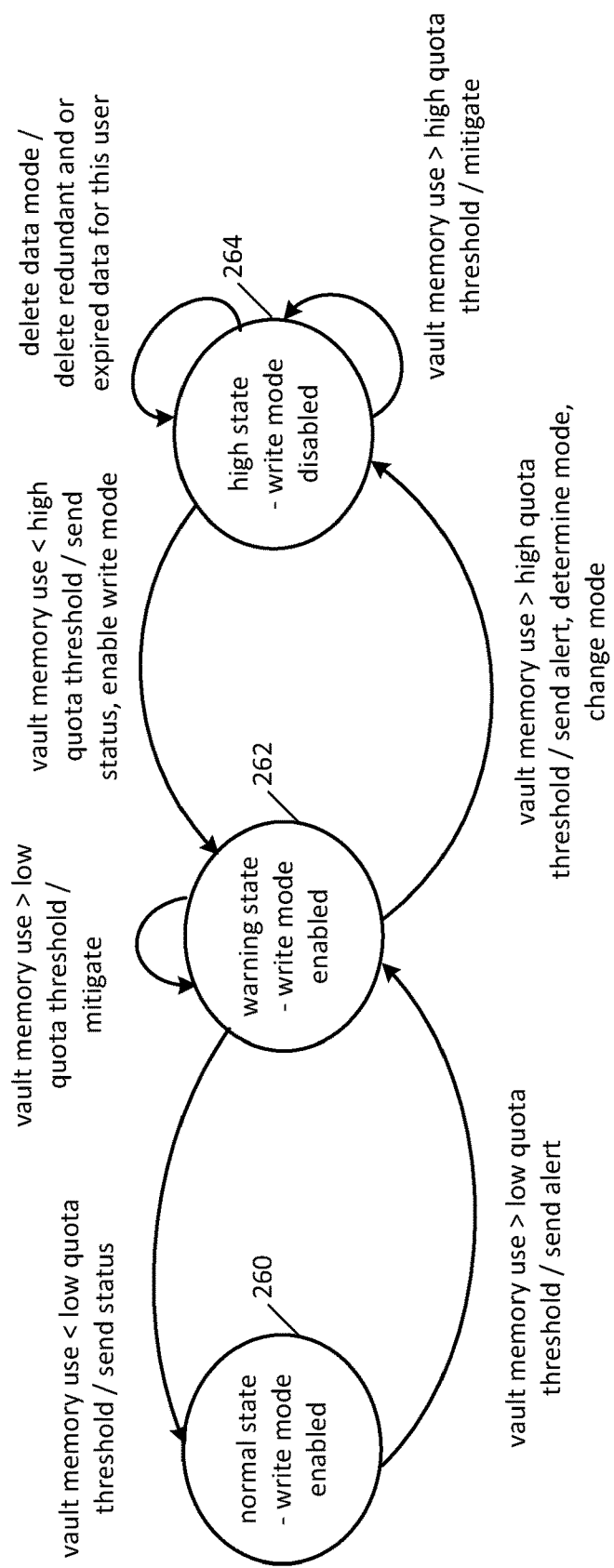
FIG. 9B is another state transition diagram illustrating the allocation of memory.

FIG. 9B is another state transition diagram illustrating the allocation of memory where the DS processing unit and/or DS unit controls the allocation and use of vault memory based on a quota for the vault. Generally, the DS processing unit and/or DS unit determines the state based on how much vault memory use there is compared to at least one quota threshold. The DS processing unit and/or DS unit controls access to the vault memory based on the state (e.g., slow or stop writes). The DS processing unit and/or DS unit may take action (e.g., deleting data) to enable a state transition to a more desired state as will be discussed below.

The vault memory state may be in one of at least three states. The three states include a normal state 260, a warning state 262, and a high state 264. The DS processing unit and/or DS unit allows writes to the vault memory when the state is the normal state 260 or the warning state 262. The DS processing unit and/or DS unit may not allow writes to the vault memory when the state is the high state 264.

Generally, the DS processing unit and/or DS unit determines the state based on a vault memory use indicator and at least two thresholds of comparison, similar to that described above in connection with FIG. 8. The DS processing unit and/or DS unit determines the vault memory indicator to indicate how full the vault memory is with stored data (e.g., slices) by an absolute measure (e.g., 2.5 terabytes for the vault memory) or as a percentage of a memory quota for the vault (e.g., 60% of the memory quota amount is utilized). The determination may be based on one or more of a lookup in the user vault (e.g., the DS processing unit and/or DS unit may increment a memory utilization counter in the user vault upon new stores), and/or a query response to the DSN memory. The DS processing unit and/or DS unit may determine the memory quota based on one or more of operational parameters of the vault, the user profile, a default allocation, a list, a command, a request, a user input, the DS managing unit, another DS processing unit and/or DS unit, and/or a dynamic parameter.

In an embodiment, the two thresholds of comparison include a low quota threshold and a high quota threshold where the high quota threshold is higher than the low quota threshold. For example, the low quota threshold may indicate 75% utilization of the memory quota and the high quota threshold may indicate 95% utilization of the memory quota. The DS processing unit and/or DS unit may determine the thresholds based on one or more of operational parameters of the vault, the user profile, a default, a list, a command, a request, a user input, the DS managing unit, another DS processing unit and/or DS unit, a rate of memory use indicator, and/or a dynamic parameter.

The vault memory state begins in the normal state 260 where the DS processing unit and/or DS unit allows storing more data slices to the vault memory by activating a write mode. The DS processing unit and/or DS unit may save the mode in the user vault such that the DS processing unit and/or DS unit may subsequently retrieve the mode from the user vault to readily determine the mode prior to storing new data to the vault memory. For example, the DS processing unit sends new EC data slices to the DS units of the vault memory when the DS processing unit determines the mode is the write mode. In another example, the DS processing unit may not send new EC data slices to the DS units when the DS processing unit determines the mode is a read only mode (e.g., when in the high state 264).

The DS processing unit and/or DS unit transitions the state of the storage set from the normal state 260 to the warning state 262 when the DS processing unit and/or DS unit detects that the vault memory use is greater than the low quota threshold. The DS processing unit and/or DS unit may send an alert message that includes the vault ID and a warning indicator (e.g., to invoke another process and/or to alert a system administrator).

The DS processing unit and/or DS unit determines if the vault memory use is still greater than the low quota threshold while the state is the warning state 262. The DS processing unit and/or DS unit performs a mitigation function when the DS processing unit and/or DS unit determines that the vault memory use is still greater than the low quota threshold. The mitigation function is intended to reduce the amount of memory used. The mitigation may include one or more of determining if replacement memory has been added for the vault such that data may be moved to the replacement memory, determining if more memory has been added to the vault memory such that data may be rebalanced between the current vault memory and the additional memory, and/or determining if a message has been received to temporarily utilize another memory for storage for this vault memory (e.g., outside of the vault memory including a different DS unit, a different DSN memory, or outside of the computing system).

The DS processing unit and/or DS unit transitions the state of the storage set from the warning state 262 to the normal state 260 when the DS processing unit and/or DS unit detects that the vault memory use is less than the low quota threshold. It should be noted that this may be a result of one or more of the DS processing unit and/or DS unit performing the mitigation function, a process has deleted data freeing up memory, and/or the user has deleted a portion of the data in response to the alert message. The DS processing unit and/or DS unit may send a status message that includes the vault ID and a state indicator (e.g., normal state).

The DS processing unit and/or DS unit transitions the state of the storage set from the warning state 262 to the high state 264 when the DS processing unit and/or DS unit detects that the vault memory use is greater than the high quota threshold. The DS processing unit and/or DS unit may send an alert message that includes the vault ID and a high state indicator (e.g., to invoke another process and/or to alert a system administrator). The DS processing unit and/or DS unit may also change the mode from write mode to read only mode based on a command, a vault parameter, memory availability, a dynamic parameter (e.g., rate of memory use), and/or estimated time to mitigation complete. In an example, the DS processing unit and/or DS unit determines to leave the write mode active based on the rate of adding data to the storage set is slow as compared to others or a benchmark. In another example, the DS processing unit and/or DS unit determines to change the mode to read only based on relatively high rate of adding data and/or the relatively high level of memory utilization.

The DS processing unit and/or DS unit may also activate a delete data mode when the state is the high state for the vault memory. The determination may be based on one or more of a command, a vault parameter, memory availability, a dynamic parameter (e.g., rate of memory use), and/or estimated time to mitigation complete. For example, the DS processing unit and/or DS unit may activate the delete data mode when the memory utilization is relatively high and the warning state mitigation has not substantially lowered the memory utilization.

The DS processing unit and/or DS unit may delete redundant and/or expired data to free up memory when the delete data mode is active to reduce the vault memory use. The DS processing unit and/or DS unit may determine redundant data based on retrieving data object from the storage set and comparing the data objects to each other, or by retrieving data object checksums from the vault memory and comparing the data object checksums to each other. The DS processing unit and/or DS unit may determine expired data based on retrieving data object version numbers from the vault memory and comparing the data object version numbers to each other to identify the most current and the older versions. The DS processing unit and/or DS unit may delete a redundant or older version of the data object and point all directory filenames for the data object to the single most current copy in the vault memory. Methods to delete data and to prevent duplication of data will be discussed in greater detail with reference to FIGS. 10-11.

The DS processing unit and/or DS unit determines if the vault memory use is still greater than the high quota threshold while the state is the high state 264. The DS processing unit and/or DS unit performs the mitigation function when the DS processing unit and/or DS unit determines that the vault memory use is still greater than the high quota threshold. The mitigation function is intended to reduce the amount of memory used as was previously discussed.

The DS processing unit and/or DS unit transitions the state of the storage set from the high state 264 to the warning state 262 when the DS processing unit and/or DS unit detects that the vault memory use is less than the high quota threshold. It should be noted that this may be a result of one or more of the DS processing unit and/or DS unit performing the mitigation function, a process has deleted data freeing up memory, and/or the user has deleted a portion of the data in response to the alert message. The DS processing unit and/or DS unit may send a status message that includes the vault ID and a state indicator (e.g., warning state). The DS processing unit and/or DS unit may enable the writing to the storage set by activating the write mode. The activities in the warning state may also continue, as discussed earlier.

Figure 9C:
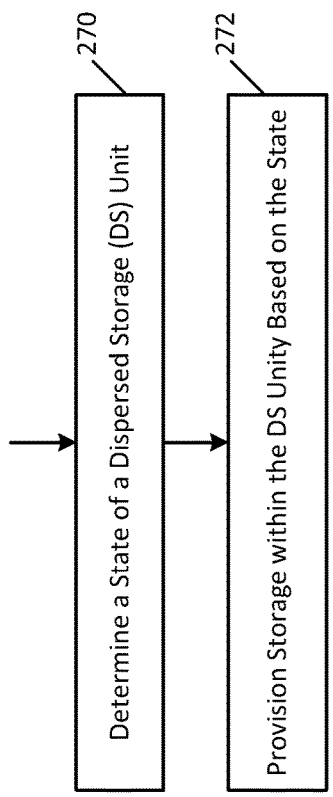
FIG. 9C is a logic diagram of an exemplary method for managing a dispersed storage network.

FIG. 9C is a logic diagram illustrating an exemplary method for managing a dispersed storage network. The method begins with the DS managing unit determining a state of a DS unit or set of DS units supporting a vault 270. The state of the DS unit can be determined, for example, by comparing the current DS unit memory fullness to at least two thresholds. The DS managing unit then provisions storage within the DS unit based on the state thereof 272. For example, the DS managing unit can perform one or more mitigation functions to reduce the memory fullness of the DS unit, change the mode of the DS unit from a write mode to a read only mode and send a status message with the state of the DS unit to a system administrator, user or other process within the DS network.

Figure 10A:
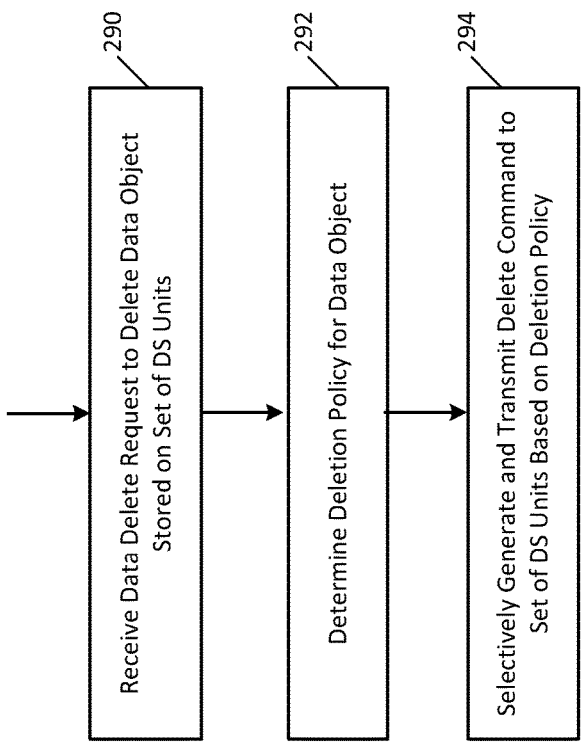
FIGS. 10A and 10B are logic diagrams of exemplary methods for managing the deletion of data objects.

FIG. 10A is a logic diagram illustrating an exemplary method for the deletion of data in accordance with the invention. The method begins with a dispersed storage device, such as the DS processing unit, DS managing unit or other DS device, receiving a data delete request to delete a data object stored throughout a set of dispersed storage units within a dispersed network memory of the dispersed storage network 290.

The dispersed storage device then determines a deletion policy for the data object 292. For example, the deletion policy may be determined from one or more of a vault lookup by user, a vault lookup by a group of affiliated users, a command, a static list, a dynamic list, and/or deletion history. In addition, the deletion policy may be driven by various data retention rules, including regulatory rules, statutory rules, standards, procedures, checklists, status, and/or other rules. For example, a data retention rule may require all email to be retained for a minimum of two years prior to deletion. In another example, a data retention rule may require all video surveillance data objects to be retained for a minimum of five years prior to deletion.

Based on the deletion policy, the dispersed storage device selectively generates and transmits a delete command to the set of dispersed storage units 294 that causes the set of dispersed storage units to delete the data slices of the data object stored therein. For example, the deletion policy may enable the dispersed storage device to immediately delete the data object, and therefore, the dispersed storage device can immediately generate and transmit the delete command. As another example, the deletion policy may prevent the dispersed storage device from deleting the data object until after a predetermined time period has elapsed or until after the data object has been moved (e.g., copied over to long-term storage). In a further example, the deletion policy may prevent the dispersed storage device from ever deleting the data object, and therefore, the dispersed storage device is unable to generate and transmit the delete command for the data object.

Figure 10B:
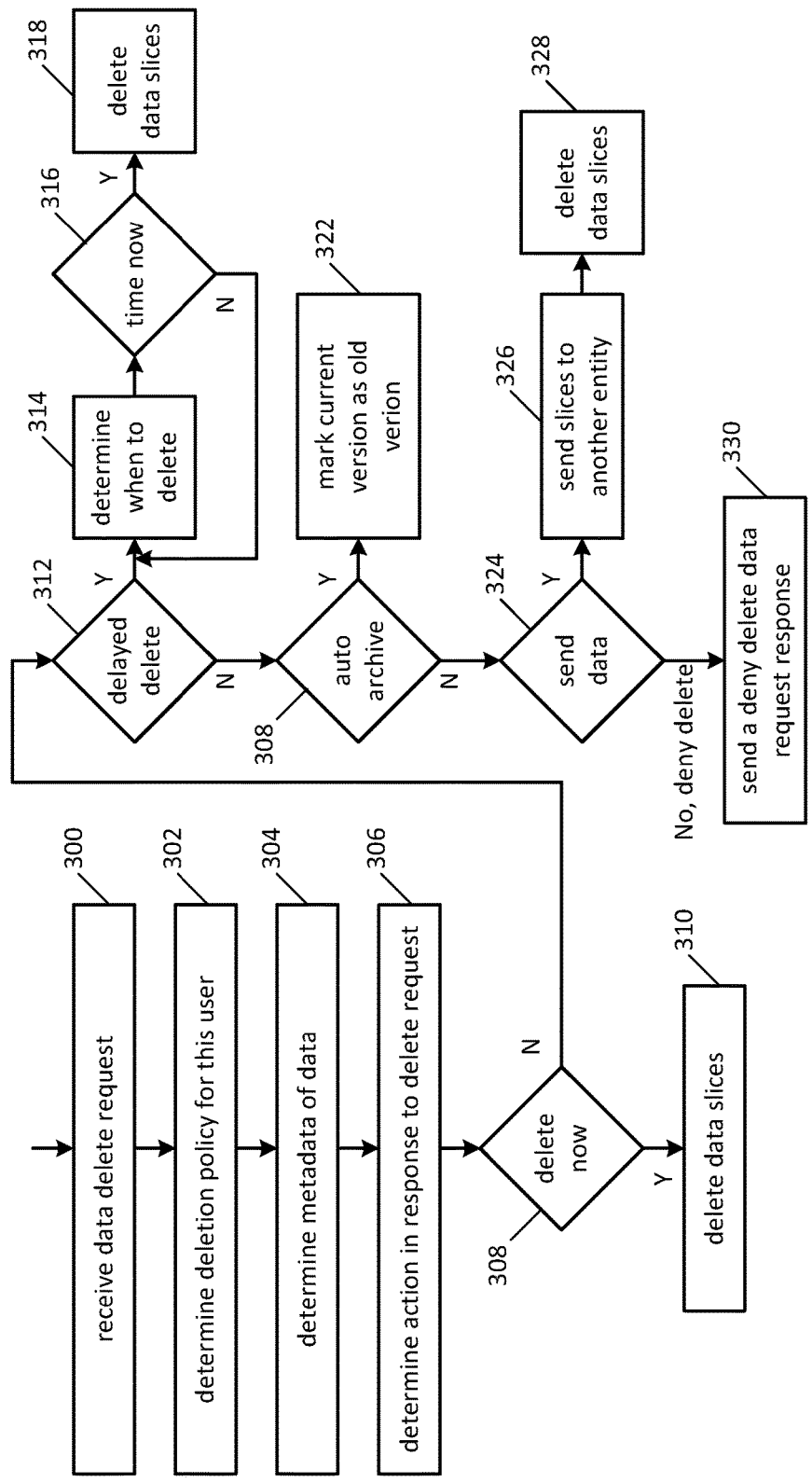

FIG. 10B is a logic diagram illustrating a more detailed exemplary method for the deletion of data, where the DS processing unit may allow data in the DSN memory to be deleted only when compliance to a deletion policy is enforced.

The method begins with DS processing unit receiving a data delete request (e.g., including the data object name or ID) from a system resource, such as the user device, another DS processing unit, the DS managing unit, and/or the storage integrity processing unit 300.

The DS processing unit then determines the deletion policy for the data object based on one or more of a vault lookup by user, a vault lookup by a group of affiliated users, a command, a static list, a dynamic list, and/or deletion history 302. It should be noted that the data deletion policy may be captured by the DS managing unit, driven by various data deletion/retention rules, including regulatory rules, statutory rules, standards, procedures, checklists, status, and/or other rules. It should further be noted that the data deletion/retention rules may provide guidance for action based on data object metadata, as described in more detail below. For example, a data retention rule may require all email to be retained for a minimum of two years prior to deletion. In another example, the data retention rule may require all video surveillance data objects to be retained for a minimum of five years prior to deletion, unless the deletion requester is user device U039 in which case the retention period may be one year.

The DS processing unit next determines the metadata of the data object based on one or more of a vault lookup, history records, time stamps, stored metadata (e.g., retrieve the slices and recreate the metadata from the original storage), requester identity, data object inspection (e.g., retrieve the slices and recreate the data object), and/or security level query (e.g., request a security level update from the DS managing unit or other) 304. For example, the metadata may include the data type, file type, file size, file age, file access history, file name, priority, a user group affiliation, a security level, date stored, and/or date of last retrieval.

Thereafter, the DS processing unit determines a deletion rule in response to the delete request based on a comparison of the deletion policy to the metadata 306. It should be noted that some rules restrict data deletion and other rules enable data deletion. For example, a time based rule may restrict data deletion for a specific time frame. In another example, a file type based rule may enable data deletion of certain file types (e.g., music files). It should also be noted that rules may be linked or chained. For example, a rule to retain email for two years may be linked to a rule that enables email deletion prior to two years if the email was a particular type (e.g., received from a known spam source).

When the DS processing unit determines the deletion rule to be delete now (e.g., when the deletion policy allows immediate data deletion) 308, the DS processing unit sends a delete command to the DS units to delete the data slices 310. In addition, the DS processing unit may also update the virtual DSN address to physical location table.

However, when the DS processing unit determines the deletion rule is not delete now, the DS processing unit determines whether the deletion rule is a delayed delete (e.g., when the deletion policy allows data deletion after a time period and/or condition has been met) 312. When the deletion rule is a delayed delete, the DS processing unit determines when the deletion may occur 314. The determination may be based on one or more of the expiration of a timer from the initial time of storage, the expiration of a timer from receiving the delete data request, and/or a period of time necessary for another entity (e.g., a different DSN memory) to request and receive the EC data slices. When the DS processing unit determines that the deletion time is now 316, the DS processing unit sends the delete command to the DS units to delete the data slices and may update the virtual DSN address to physical location table 318.

When the DS unit determines the deletion rule to be auto archive 320, the DS processing unit sends commands to the DS units to mark the data slices as an old version and may update the virtual DSN address to physical location table 322. For example, a policy rule may require that all financial records be saved without deletion by archiving the data as the old version. In another embodiment, the DS processing unit may retrieve the EC data slices, recreate the data object, determine archive dispersal parameters, code and slice the data object in accordance with the archive dispersal parameters, and send the slices for storage in the DSN memory with a store command. The DS processing unit may determine the archive dispersal parameters based on one or more of a vault lookup for the vault user, a command, and/or a common system wide parameter lookup. It should be noted that the archive dispersal parameters may improve the subsequent data object reconstruction reliability for long storage time periods (e.g., a larger number of pillars and a smaller read threshold).

When the DS unit determines the deletion rule to be send data (e.g., move the data before deleting it from the current vault) 324, the DS processing unit retrieves the data slices, determines where to send the slices, and sends the slices to another entity (e.g., another DS processing unit, another DSN memory, etc.) 326. The determination may be based on one or more of a vault lookup for the vault user, a vault lookup for a group of affiliated users, and/or a common system wide parameter lookup. In another embodiment, the DS processing unit may retrieve the EC data slices, recreate the data object, determine secondary dispersal parameters, code and slice the data object in accordance with the secondary dispersal parameters, and send the slices to the other entity. The determination of the secondary dispersal parameters may be based on one or more of a vault lookup for the other entity, a vault lookup for the vault user, a command, and/or a common system wide parameter lookup. In still another embodiment, the DS processing unit may retrieve the EC data slices, recreate the data object, and send the data object to the other entity.

When the DS unit determines the slices and/or data object have been received by the other entity, the DS processing unit sends the delete command to the DS units to delete the data slices and may update the virtual DSN address to physical location table 328.

However, when the DS unit determines the deletion rule to be deny the delete (No branch from 324), the DS processing unit sends a deny delete response message to the system resource that requested the data delete 330. For example, the response message may indicate that there was no condition upon which the data may be allowed to be deleted at this time.

Figures 11A, 11B:
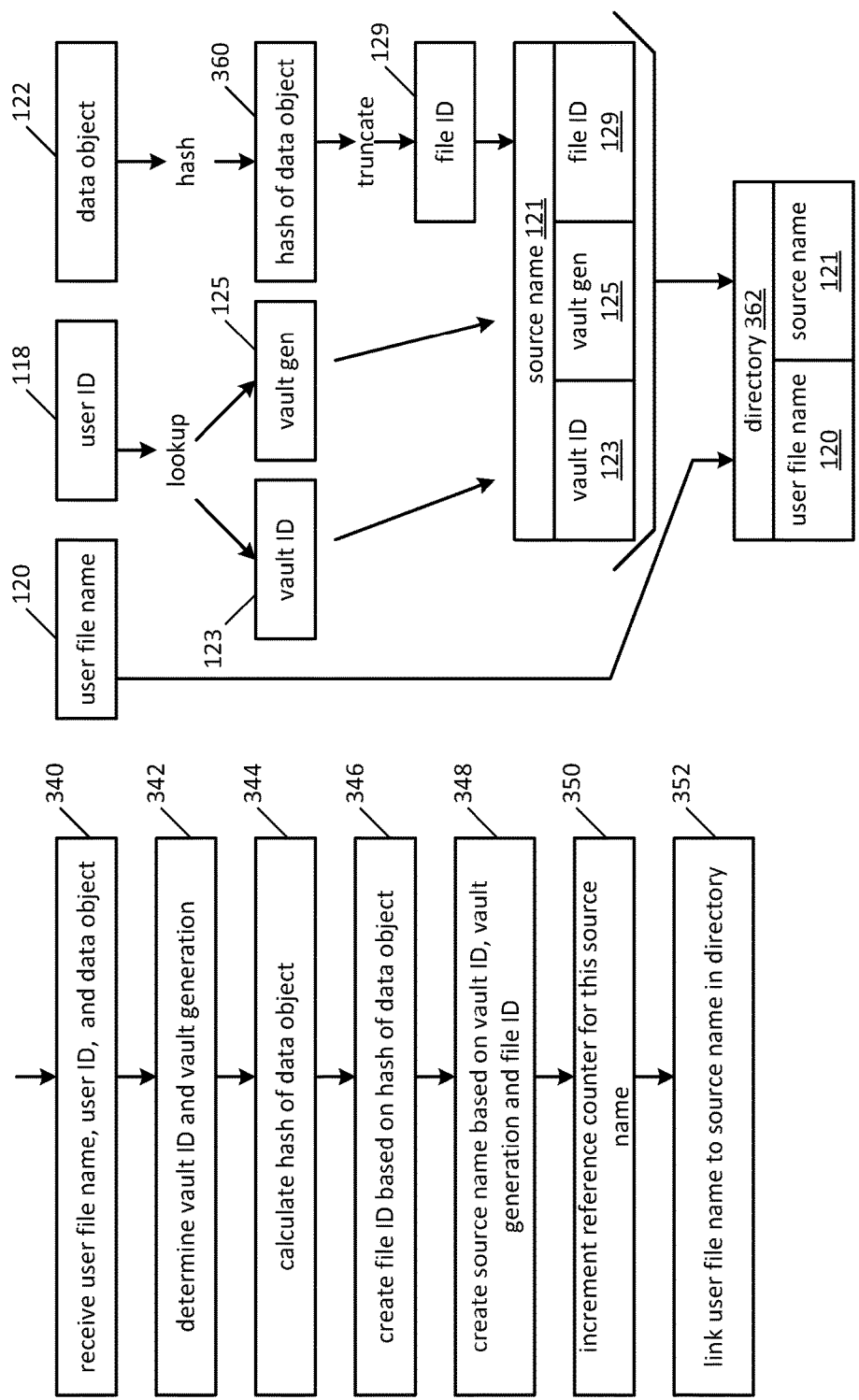
FIG. 11A is a logic diagram of an exemplary method for managing a file system directory.
FIG. 11B is a schematic block diagram illustrating the creation of an entry in the file system directory.

FIG. 11A is a logic diagram illustrating an exemplary method for the creation of a file system directory, where the gateway module of the DS processing unit or the processing module of the DS unit may convert one or more user file names into a common source name when the data object is the same. It should be noted that linking two or more different user file names in the directory to the same set of EC data slices (common source name) in the DSN memory may serve to improve the efficiency of the computing system by reducing the amount of duplicate stored data.

FIG. 11A will be described in connection with FIG. 11B, which illustrates the creation of an exemplary entry in the file system directory. The method begins with the processing module of the gateway module or DS unit receiving, at 340, the user file name (object name) 120, user ID 118, and data object 122 to store in the DSN memory. The processing module may then determine the vault ID 123 and vault generation 125 based on a lookup in the directory or vault for the user, at 342.

The processing module next calculates a data compression function, at 344, such as a hash (e.g., CRC) checksum, randomization function or other data compression function, of the data object 122 to produce a hash 360 (or other compressed data result) of the data object 122. Based on the data compression function, at 346, the processing module creates the file ID 129 for the data object 122. In an exemplary embodiment, the byte width of the hash 360 is greater than the byte width of the file ID 129. Therefore, the processing module creates the file ID 129 based on the hash of the data object by truncating the hash 360 to match the byte width of the file ID 129.

The processing module then creates the source name 121 for the data object, at 348, by aggregating the vault ID 123, vault generation 125, and file ID 129. It should be noted that the source name 121 is the same for the same data object 122 regardless of the attached user file name 120. In one embodiment, the processing module then increments a reference counter for this source name 121 in the directory, at 350, to signify the number of user file names for this data object/source name pair. It should be noted that the processing module increments the same reference counter each time a user stores a data object that is identical. It should further be noted that the processing module decrements the reference counter when a delete data object request is received from the user for a file name linked to the same source name. The processing module deletes the EC data slices from the DSN memory when the reference counter reaches zero.

The processing module then links the user file name 120 to the source name 121 in the directory 362, at 352. The processing module utilizes the directory upon subsequent retrieval requests cross referencing the user file name to the source name in the DSN memory. It should be noted that all retrieval requests for the same source name will retrieve that single copy of the EC data slices via the source name. In addition, it should be noted that two or more vaults may share the same stores by linking user file names from each vault to a common DSN source name to improve the overall efficiency of the computing system.

Figure 12:
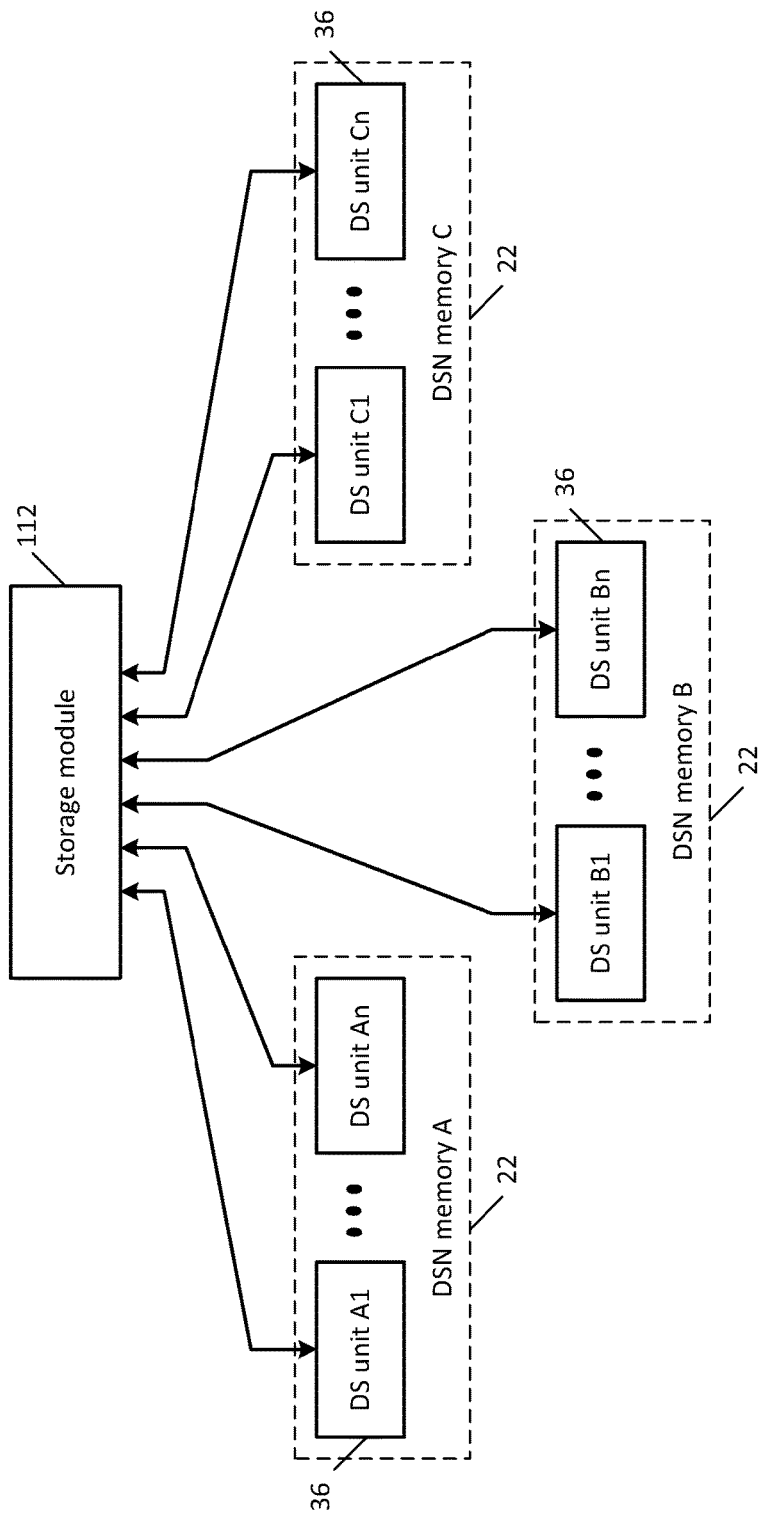
FIG. 12 is a schematic block diagram of another embodiment of a computing system in accordance with the invention.

FIG. 12 is a schematic block diagram of another embodiment of a computing system that includes the storage module 112 of the DS processing unit 102, and one or more DSN memories 22, each including one or more DS units 36. For example, DSN memory A may be a DSN memory system of a first geographic area or jurisdiction and contain DS units A1 . . . An, DSN memory B may be a DSN memory system of a second geographic area or jurisdiction and contain DS units B1 . . . Bn, and DSN memory C may be a DSN memory system of a third geographic area or jurisdiction and contain DS units C1 . . . Cn. It should be noted that a jurisdiction may signify a geographic area of operational responsibility for a military unit, a government agency, enterprise, organization, or similar. The storage module 112 may choose how much of each DSN memory 22 to utilize to improve the overall security and reliability of the computing system. Although the storage module 112 is shown in FIG. 12, it should be understood that the selection of DS units may be made by other components of the DS processing unit, DS unit, DS managing unit or DS storage integrity processing unit.

In an example, the DSN memory systems 22 may have different security threats, environmental, construction, and performance variables, including different geographic regions, costs, performance, levels of security, DS storage unit operating systems, and availability. A DSN memory 22 as a whole may be a plurality of fixed and/or portable devices with real time changes occurring in the associated variables. For example, DSN memory A may be contained within one or more fixed-wing aircraft moving together or in different directions. In another example, DSN memory B may be contained within a single military bunker. In another example, DSN memory C may be constructed with all Linux operating system DS storage servers and may be installed in eight different sites all with two external power feeds and a standby power generator.

The storage module 112 may determine where to disperse (store) EC data slices based in part on security, environmental and performance variables. For example, the storage module 112 may choose to store slices of data objects in only a certain number (e.g., less than a threshold k) of DS units in DSN memory B to improve the security of the data. For example, by only storing data slices on a certain number of DS units in DSN memory B corresponding to a particular geographical region, the data cannot be recreated even if every DS unit in the region of DSN memory B were physically compromised.

The storage module 112 may also determine to utilize DS storage units from one or more DSN memory systems 22 when the determination results in a favorable comparison of the storage requirements to the predicted storage performance. For example, the storage module 112 may determine a favorable comparison when the predicted performance substantially meets the requirements. The storage module 112 may determine the predicted performance based in part on the security, environmental, construction, and performance variables. The storage module 112 may also determine the storage requirements based on user vault operational or security parameters, a command, type of data, a security level of the data, a cost goal, a retrieval time need, an availability indicator, and/or any other metric to specify requirements. The storage module determination of where to store EC data slices will be discussed in greater detail with reference to FIG. 13.

Figure 13:
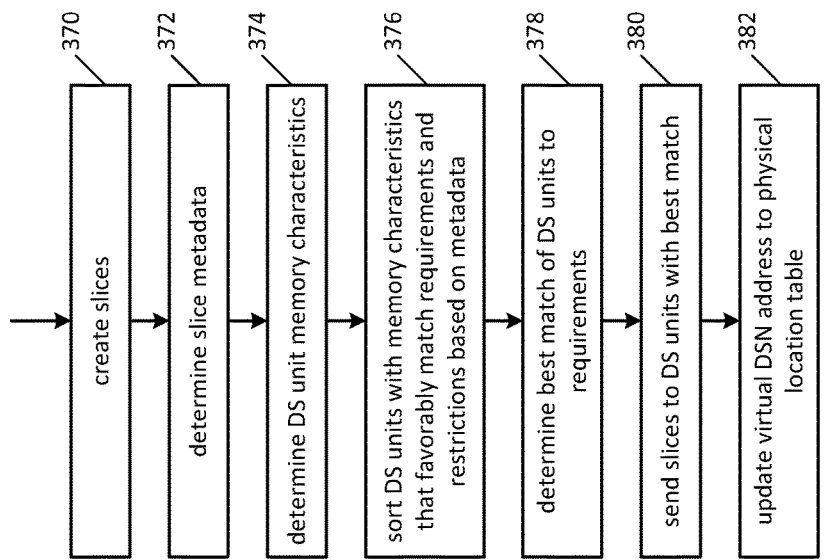
FIG. 13 is a logic diagram of an exemplary method for selecting dispersed storage units for writing data objects.

FIG. 13 is a logic diagram illustrating an exemplary method for selecting DS units to store data slices, where the DS processing unit (or DS unit) may employ a memory diversity scheme to choose memory systems and DS units within the memory systems to store slices such that the overall system security and reliability is improved. For example, the memory diversity scheme may ensure that a threshold of k data slices are stored in DS units that are each of a different model to avoid unrecoverable data due to a potentially common memory design defect.

The method begins with the DS processing unit creating the data slices for dispersed storage 370. The DS processing unit then determines the slice metadata based on one or more of a file type, file size, priority, a security index, a user group affiliation, estimated storage time, estimated time between retrievals and more 372. From the slice metadata, the DS processing unit can determine the various storage requirements, such as similarity requirements and difference requirements, where similarity requirements drive similar attributes of the DS unit choices and difference requirements drive difference attributes of the DS unit choices. For example, a security requirement may impose a restriction that requires fewer than a threshold k of pillars exist in one DSN memory (e.g., geographic region). In another example, the storage requirement may be a fast retrieval characteristic that requires a relatively short estimated time between retrievals, which may drive DS unit choices that all share a similar fast retrieval characteristic to speed frequent retrievals. Other examples of storage requirements may include similar cost and similar capacity. In another example, a storage requirement for very high reliability may drive DS unit choices that all have a different memory models to improve the reliability of retrievals. Other examples of storage difference requirements may include different operating systems and different installation sites.

Next, the DS processing unit determines the DS unit memory characteristics for one or more candidate DS units 374. The determination may be made via a table lookup or a real time request to each DS unit to query for the memory characteristics. The memory characteristics may include one or more of associated DSN memory, location, proximity to other DSN memory systems, memory model, memory type, total capacity, available capacity, access speed, error history, estimated mean time between failures, actual mean time between failures, and/or hours of operation.

The DS processing unit then sorts the DS units that favorably match the storage requirements by comparing the storage requirements to the memory characteristics 376. For example, DS units with memory that have a fast access memory characteristic may be sorted to favorably match the fast retrieval requirement. In another example, DS units with memory that have a different location memory characteristic may be sorted to favorably match the security driven different location requirement.

The DS processing unit determines the best match of DS units to the storage requirements based on the sort 378. For example, the DS processing unit may choose at most n-k DS units with the same model, similar error histories, or similar total hours to improve the reliability of data object retrieval. In other words, the DS unit may choose the DS units that have the most different models, error histories, and total hours as the memory diversity scheme. In another example, the DS processing unit may choose DS units such that at most R (e.g., 0-n but likely much less than k) data slices of the same restricted file type (e.g., surveillance video) are stored at a particular DS unit or DSN memory system to improve security.

Once the DS processing unit has selected the DS units for storage of a data object, the DS processing unit sends the data slices of the data object to the corresponding chosen DS units with the best match of memory characteristics to storage requirements 380 and updates the virtual DSN address to physical location table with the locations of the data slices 382.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "coupled to" and/or "coupling" and/or includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" indicates that an item includes one or more of power connections, input(s), output(s), etc., to perform one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

What is claimed is:

1. A method for execution by a computing device of a dispersed storage network (DSN), the method comprising:
determining, by the computing device, virtual memory use of a vault based on virtual memory use of one dispersed storage (DS) unit of a set of DS units that services the vault within the DSN, wherein data is disperse storage error encoded in accordance with an error coding scheme to produce a plurality of sets of error coded (EC) data slices that are stored in the vault, wherein the error coding scheme includes a pillar width number and a read threshold number, wherein the pillar width number is a total number of EC data slices within a set of EC data slices of the plurality of sets of EC data slices, wherein the read threshold number is a number of EC data slices of the set of EC data slices that is required to reconstruct a corresponding data segment of the data, wherein the read threshold number is less than the pillar width number, and wherein the virtual memory use of a DS unit of the set of DS units is representative of the virtual memory use of other DS units of the set of DS units for the vault due to the error coding scheme;
when the virtual memory use of the vault exceeds a vault threshold, determining, by the computing device, whether the virtual memory use of the vault can be expanded based on one or more dispersed data storage parameters; and when the virtual memory use of the vault can be expanded:

determining, by the computing device, available physical memory for each DS unit of the set of DS units; and when at least the read threshold number of DS units of the set of DS units has available physical memory above an availability threshold, allocating, by the computing device, at least a portion of available physical memory within the at least the read threshold number of DS units of the set of DS units for the vault to expand the virtual memory use of the vault.

2. The method of claim 1, wherein the determining virtual memory use of the vault comprising:

requesting, from the one DS unit, the virtual memory use of the one DS unit that includes a list of EC data slices stored within the one DS unit for the vault, data sizes for the listed EC data slices, and DSN addresses for the listed EC data slices, and wherein the DSN addresses at least partially include EC data slice names for the listed EC data slices; and interpreting the virtual memory use of the one DS unit based on a predetermined logical size of the vault to determine when the virtual memory use of the vault exceeds the vault threshold.

3. The method of claim 1, wherein the one or more dispersed data storage parameters comprises one or more of:

valid user identifiers;
a predetermined logical size of the vault;
the vault threshold;
an indication of whether the predetermined logical size of the vault is fixed or can be expanded; and
a vault identifier.

4. The method of claim 1 further comprising:

when the vault cannot be expanded based on the one or more dispersed data storage parameters, performing one or more mitigation operations to the vault so that the virtual memory use of the vault does not exceed a predetermined logical size of the vault.

5. The method of claim 4, wherein the one or more mitigation operations comprising one or more of:

restricting write access to the vault;
requesting expansion of the vault;
transferring one or more sets of the plurality of sets of EC data slices to another vault; and
establishing overwriting access to the vault, wherein older EC data slices are deleted to make available memory space for new EC data slices.

6. The method of claim 1 further comprising:

when less than the read threshold number of DS units of the set of DS units has available physical memory above the availability threshold, performing one or more mitigation operations to the vault so that the virtual memory use of the vault does not exceed a predetermined logical size of the vault.

7. The method of claim 1 further comprising:

when the at least the read threshold number of DS units of the set of DS units, but fewer than all of the DS units of the set of DS units, has available physical memory above the availability threshold, requesting expansion of physical memory allocation for each DS unit of the set of DS units that does not have available physical memory above the availability threshold; and storing, in a rebuild list, identities of EC data slices associated with write requests to the vault that cannot be currently processed by each of the DS units of the set of DS units that does not have available physical memory above the availability threshold.

8. The method of claim 1 further comprising:

when the vault cannot be expanded based on the one or more dispersed data storage parameters, prohibiting additional EC data slices to be written to the vault and allowing read only access to the plurality of sets of EC data slices.

9. A distributed storage (DS) processing unit of a dispersed storage network (DSN) comprises:

memory;
a network interface configured to support communications within the DSN; and
a processing module operably coupled to the memory and the network interface, wherein the processing module is operable to:

determine virtual memory use of a vault based on virtual memory use of one dispersed storage (DS) unit of a set of DS units that services the vault within the DSN, wherein data is disperse storage error encoded in accordance with an error coding scheme to produce a plurality of sets of error coded (EC) data slices that are stored in the vault, wherein the error coding scheme includes a pillar width number and a read threshold number, wherein the pillar width number is a total number of EC data slices within a set of EC data slices of the plurality of sets of EC data slices, wherein the read threshold number is a number of EC data slices of the set of EC data slices that is required to reconstruct a corresponding data segment of the data, wherein the read threshold number is less than the pillar width number, and wherein the virtual memory use of a DS unit of the set of DS units is representative of the virtual memory use of other DS units of the set of DS units for the vault due to the error coding scheme;

when the virtual memory use of the vault exceeds a vault threshold, determine whether the virtual memory use of the vault can be expanded based on one or more dispersed data storage parameters; and when the virtual memory use of the vault can be expanded:

determine available physical memory for each DS unit of the set of DS units; and when at least the read threshold number of DS units of the set of DS units has available physical memory above an availability threshold, allocate at least a portion of available physical memory within the at least the read threshold number of DS units of the set of DS units for the vault to expand the virtual memory use of the vault.

10. The DS processing unit of claim 9, wherein the processing module is further operable to:

receive information, from the one DS unit, related to the virtual memory use of the one DS unit that includes a list of EC data slices stored within the one DS unit for the vault, data sizes for the listed EC data slices, and DSN addresses for the listed EC data slices, and wherein the DSN addresses at least partially include EC data slice names for the listed EC data slices; and interpret the virtual memory use of the one DS unit based on a predetermined logical size of the vault to determine when the virtual memory use of the vault exceeds the vault threshold.

11. The DS processing unit of claim 9, wherein the one or more dispersed data storage parameters comprises one or more of:
- valid user identifiers;
- a predetermined logical size of the vault;
- the vault threshold;
- an indication of whether the predetermined logical size of the vault is fixed or can be expanded; and
- a vault identifier.

12. The DS processing unit of claim 9, wherein the processing module is further operable to:
- perform one or more mitigation operations to the vault so that the virtual memory use of the vault does not exceed a predetermined logical size of the vault when the vault cannot be expanded based on the one or more vault parameters.

13. The DS processing unit of claim 12, wherein the processing module is further operable to perform the one or more mitigation operations by performing one or more of:
- restrict write access to the vault;
- request expansion of the vault;
- transfer one or more sets of the plurality of sets of EC data slices to another vault; and
- establish overwriting access to the vault, wherein older EC data slices are deleted to make available memory space for new EC data slices.

14. The DS processing unit of claim 9, wherein the processing module is further operable to:
- perform one or more mitigation operations to the vault so that the virtual memory use of the vault does not exceed a predetermined logical size of the vault when less than the read threshold number of DS units of the set of DS units has available physical memory above the availability threshold.

15. The DS processing unit of claim 9, wherein the processing module is further operable to:
- request expansion of physical memory allocation for each DS unit of the set of DS units that does not have available physical memory above the availability threshold when the at least a read threshold number of DS units of the set of DS units, but fewer than all of the DS units of the set of DS units, has available physical memory above the availability threshold; and
- store, in a rebuild list, identities of EC data slices associated with write requests to the vault that cannot be currently processed by each of the DS units of the set of DS units that does not have available physical memory above the availability threshold.

16. A non-transitory computer readable medium having instructions causing a processing module in a distributed storage (DS) unit of a dispersed storage network (DSN) to execute a method comprising:
- determining virtual memory use of a vault based on virtual memory use of one dispersed storage (DS) unit of a set of DS units that services the vault within the DSN, wherein data is disperse storage error encoded in accordance with an error coding scheme to produce a plurality of sets of error coded (EC) data slices that are stored in the vault, wherein the error coding scheme includes a pillar width number and a read threshold number, wherein the pillar width number is a total number of EC data slices within a set of EC data slices of the plurality of sets of EC data slices, wherein the read threshold number is a number of EC data slices of the set of EC data slices that is required to reconstruct a corresponding data segment of the data, wherein the read threshold number is less than the pillar width number, and wherein the virtual memory use of a DS unit of the set of DS units is representative of the virtual memory use of other DS units of the set of DS units for the vault due to the error coding scheme;
- when the virtual memory use of the vault exceeds a vault threshold, determining whether the virtual memory use of the vault can be expanded based on one or more dispersed data storage parameters; and
- when the virtual memory use of the vault can be expanded:
  - determining available physical memory for each DS unit of the set of DS units; and
  - when at least the read threshold number of DS units of the set of DS units has available physical memory above an availability threshold, allocating at least a portion of available physical memory within the at least the read threshold number of DS units of the set of DS units for the vault to expand the virtual memory use of the vault.

17. The non-transitory computer readable medium having instructions causing the processing module to execute the method of claim 16, wherein the determining virtual memory use of the vault comprising:
- requesting, from the one DS unit, the virtual memory use of the one DS unit that includes a list of EC data slices stored within the one DS unit for the vault, data sizes for the listed EC data slices, and DSN addresses for the listed EC data slices, and wherein the DSN addresses at least partially include EC data slice names for the listed EC data slices; and
- interpreting the virtual memory use of the one DS unit based on a predetermined logical size of the vault to determine when the virtual memory use of the vault exceeds the vault threshold.

18. The non-transitory computer readable medium having instructions causing the processing module to execute the method of claim 16, wherein the one or more dispersed data storage parameters comprises one or more of:
- valid user identifiers;
- a predetermined logical size of the vault;
- the vault threshold;
- an indication of whether the predetermined logical size of the vault is fixed or can be expanded; and
- a vault identifier.

19. The non-transitory computer readable medium having instructions causing the processing module to execute the method of claim 16 further comprising:
- when the vault cannot be expanded based on the one or more dispersed data storage parameters, performing one or more mitigation operations to the vault so that the virtual memory use of the vault does not exceed a predetermined logical size of the vault.

20. The non-transitory computer readable medium having instructions causing the processing module to execute the method of claim 19, wherein the one or more mitigation operations comprising one or more of:
- restricting write access to the vault;
- requesting expansion of the vault;
- transferring one or more sets of the plurality of sets of EC data slices to another vault; and
- establishing overwriting access to the vault, wherein older EC data slices are deleted to make available memory space for new EC data slices.

* * * * *